United States Patent
Ono

(10) Patent No.: US 11,362,354 B2
(45) Date of Patent: Jun. 14, 2022

(54) FUEL CELL SYSTEM AND FUEL CELL SYSTEM CONTROL METHOD

(71) Applicant: NISSAN MOTOR CO., LTD., Yokohama (JP)

(72) Inventor: Yoshitaka Ono, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 179 days.

(21) Appl. No.: 16/323,703

(22) PCT Filed: Aug. 12, 2016

(86) PCT No.: PCT/JP2016/073787
§ 371 (c)(1),
(2) Date: Feb. 6, 2019

(87) PCT Pub. No.: WO2018/029860
PCT Pub. Date: Feb. 15, 2018

(65) Prior Publication Data
US 2019/0173113 A1    Jun. 6, 2019

(51) Int. Cl.
*H01M 8/04746*    (2016.01)
*H01M 8/04029*    (2016.01)
(Continued)

(52) U.S. Cl.
CPC ... *H01M 8/04753* (2013.01); *H01M 8/04029* (2013.01); *H01M 8/04201* (2013.01);
(Continued)

(58) Field of Classification Search
CPC combination set(s) only.
See application file for complete search history.

(56) References Cited

U.S. PATENT DOCUMENTS 5,925,476 A * 7/1999 Kawatsu ........... H01M 8/04089
429/424
9,065,100 B2    6/2015 Iden et al.
(Continued)

FOREIGN PATENT DOCUMENTS

JP    08-138711 A    5/1996
JP    2004-146209 A    5/2004
(Continued)

*Primary Examiner* — Sadie White
(74) *Attorney, Agent, or Firm* — Foley & Lardner LLP

(57) ABSTRACT

A fuel cell system that includes a fuel cell body that is formed by a membrane electrode assembly including an anode catalyst and a cathode catalyst between which an electrolyte membrane is sandwiched and a pair of separators forming an anode-catalyst-side flow channel and a cathode-catalyst-side flow channel, a fuel supply system configured to supply fuel gas to the fuel cell body, an oxidant supply system configured to supply oxidant gas to the fuel cell body, a control device that controls these supply systems in accordance with an operating state of the fuel cell system and a catalyst deterioration recovery device that recovers deterioration of the anode catalyst. The catalyst deterioration recovery device includes a plurality of catalyst deterioration recovery means, a specific operating state detecting means configured to detect a specific operating state of the fuel cell system and a selecting means configured to selectively activate the plurality of catalyst deterioration recovery means in accordance with the specific operating state.

9 Claims, 21 Drawing Sheets

(51) Int. Cl.

| | |
|---|---|
| *H01M 8/04701* | (2016.01) |
| *H01M 8/04082* | (2016.01) |
| *H01M 8/1004* | (2016.01) |
| *H01M 8/04089* | (2016.01) |
| *H01M 8/04291* | (2016.01) |
| *H01M 8/04537* | (2016.01) |
| *H01M 8/04492* | (2016.01) |
| *H01M 8/04828* | (2016.01) |

(52) U.S. Cl.
CPC ... *H01M 8/04291* (2013.01); *H01M 8/04701* (2013.01); *H01M 8/04723* (2013.01); *H01M 8/1004* (2013.01); *H01M 8/04089* (2013.01); *H01M 8/04529* (2013.01); *H01M 8/04559* (2013.01); *H01M 8/04649* (2013.01); *H01M 8/04835* (2013.01)

(56) References Cited

U.S. PATENT DOCUMENTS

| | | | |
|---|---|---|---|
| 2003/0228504 A1 | 12/2003 | Konrad et al. | |
| 2005/0233191 A1 | 10/2005 | Ushio | |
| 2007/0154754 A1* | 7/2007 | An | H01M 8/04223 429/414 |
| 2010/0248045 A1* | 9/2010 | Sakai | H01M 8/04992 429/413 |
| 2013/0059219 A1* | 3/2013 | Kimura | H01M 4/8605 429/431 |
| 2014/0120439 A1* | 5/2014 | Makino | H01M 8/04303 429/429 |
| 2015/0171444 A1* | 6/2015 | Tanaka | H01M 8/0485 429/446 |

FOREIGN PATENT DOCUMENTS

| | | |
|---|---|---|
| JP | 3536645 B2 | 6/2004 |
| JP | 2005-25985 A | 1/2005 |
| JP | 2005-235522 A | 9/2005 |
| JP | 2005-310464 A | 11/2005 |
| JP | 2008-41478 A | 2/2008 |
| JP | 2008-293701 A | 12/2008 |
| JP | 2011-28937 A | 2/2011 |
| JP | 4969955 B2 | 7/2012 |
| JP | 5008319 B2 | 8/2012 |
| JP | 5151035 B2 | 2/2013 |
| JP | 2016-66407 A | 4/2016 |
| WO | WO 2012/176528 A1 | 12/2012 |

\* cited by examiner

FUEL CELL SYSTEM AND FUEL CELL SYSTEM CONTROL METHOD

TECHNICAL FIELD

The present invention relates to a fuel cell system and a fuel cell system control method.

BACKGROUND ART

In a fuel cell system that supplies fuel gas (anode gas) containing hydrogen to an anode electrode and supplies oxidant gas (cathode gas) containing oxygen to a cathode electrode to perform power generation, an electrode reaction is blocked and thus power performance is decreased when a phenomenon, in which carbon monoxide (hereinafter, also called "CO") adsorbs onto a catalyst layer of the anode electrode, so-called CO poisoning occurs.

As a process (hereinafter, also called "catalyst recovery process") for resolving the CO poisoning, Japanese Patent Application Laid-Open No. 2005-25985 and Japanese Patent No. 5008319 disclose a method of causing fuel gas to be supplied to an anode electrode to contain oxygen and thus oxidizing CO to detach it from a catalyst layer. Moreover, Japanese Patent No. 3536645, Japanese Patent No. 4969955, and Japanese Patent No. 5151035 disclose related descriptions on the catalyst recovery process for the anode electrode.

SUMMARY OF INVENTION

However, there is a possibility that the catalyst recovery process performed by causing fuel gas to contain oxygen as described above deteriorates an electrolyte membrane due to reaction heat generated by the reaction of hydrogen and oxygen on the catalyst layer.

Moreover, there is a possibility that the catalyst recovery process performed by causing fuel gas to contain oxygen as described above deteriorates an electrolyte membrane due to reaction heat generated by the reaction of hydrogen and oxygen on an electrode catalyst.

Therefore, an object of the present invention is to provide an apparatus and a method that can execute a catalyst recovery process while suppressing the deterioration of an electrolyte membrane.

According to an aspect of this invention, there is provided a fuel cell system and a control method for a fuel cell system configured to detect a specific operating state of the system

DESCRIPTION OF EMBODIMENTS

Hereinafter, an exemplary embodiment of the present invention will be explained with reference to the present drawings.

Figure 21:
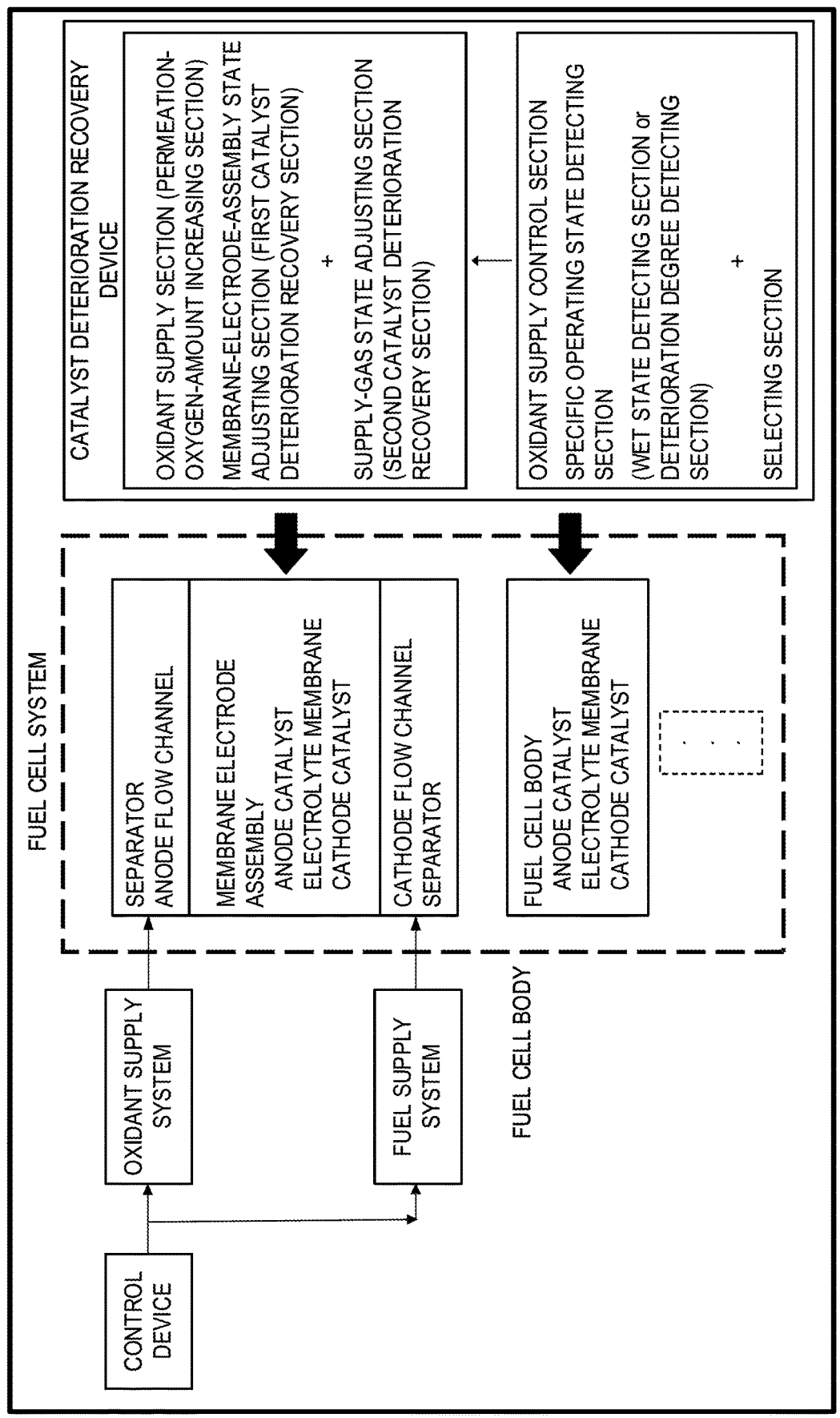
FIG. 21 is a diagram illustrating the entire configuration of the fuel cell system according to the embodiment of the present invention.

FIG. 21 is a diagram illustrating the entire configuration of a fuel cell system according to the embodiment of the present invention. As illustrated in the drawing, the fuel cell system includes: a fuel cell body formed by a membrane electrode assembly including anode and cathode catalysts between which an electrolyte membrane is sandwiched and a pair of separators forming an anode-catalyst-side flow channel and a cathode-catalyst-side flow channel; a fuel supply system configured to supply fuel gas to the cathode-side flow channel of the fuel cell body; and an oxidant supply system configured to supply oxidant gas to the anode-side flow channel, and controls these supply systems by using a control device in accordance with an operating state of the system.

Furthermore, in the present application, the fuel cell system includes a catalyst deterioration recovery device that recovers the deterioration of the anode catalyst to suppress the deterioration of the catalyst in any states.

The catalyst deterioration recovery device includes a plurality of catalyst deterioration recovery means including a permeation-oxygen-amount increasing means configured to increase an amount of oxygen permeating the membrane electrode assembly from the cathode-catalyst-side flow channel to the anode-catalyst-side flow channel, and optimally performs control in accordance with the operating state by using a selecting means configured to selectively activate the plurality of catalyst deterioration recovery means (first catalyst deterioration recovery means and second catalyst deterioration recovery means) in accordance with a signal from a specific operating state detecting means configured to detect a specific operating state of the system.

The basic control logic is to adjust a degree of the deterioration recovery in accordance with a degree of the deterioration of the catalyst, but is to perform an actuation of suppressing the deterioration even when a sign of the deterioration appears as the previous stage before a deterioration detecting means recognizes obvious deterioration.

In other words, in the present embodiment, when it is determined that the electrolyte membrane dries and thus the deterioration is advanced as the initial stage, a membrane-electrode-assembly state adjusting means (first catalyst deterioration recovery means) is driven, control of wetting the electrolyte membrane to increase an amount of oxygen permeating the membrane electrode assembly from the cathode-catalyst-side flow channel to the anode-catalyst-side flow channel is performed, and thus the deterioration recovery is promoted.

On the other hand, when it is detected that the electrolyte membrane is in a wet state, a supply-gas state adjusting means (second catalyst deterioration recovery means) is driven to increase a differential pressure between the anode side and the cathode side or to increase a cathode-side flow rate so as to increase an amount of oxygen permeating the membrane electrode assembly from the cathode-catalyst-side flow channel to the anode-catalyst-side flow channel, and thus enhances the deterioration recovery function.

Then, when a catalyst deterioration detecting means detects that a degree of deterioration is equal to or more than a predetermined value, both of the membrane-electrode-assembly state adjusting means (membrane-electrode-assembly state control means) and the supply-gas state adjusting means are driven to further enhance the deterioration recovery function. In addition, there is a flow-channel state control means as an aspect of the supply-gas state adjusting means, and the flow-channel state control means controls the flow-channel state of at least one of the anode-catalyst-side flow channel and the cathode-catalyst-side flow channel.

Hereinafter, the embodiment of the present invention will be explained in more detail.

[Configuration of Fuel Cell]

Figure 1:
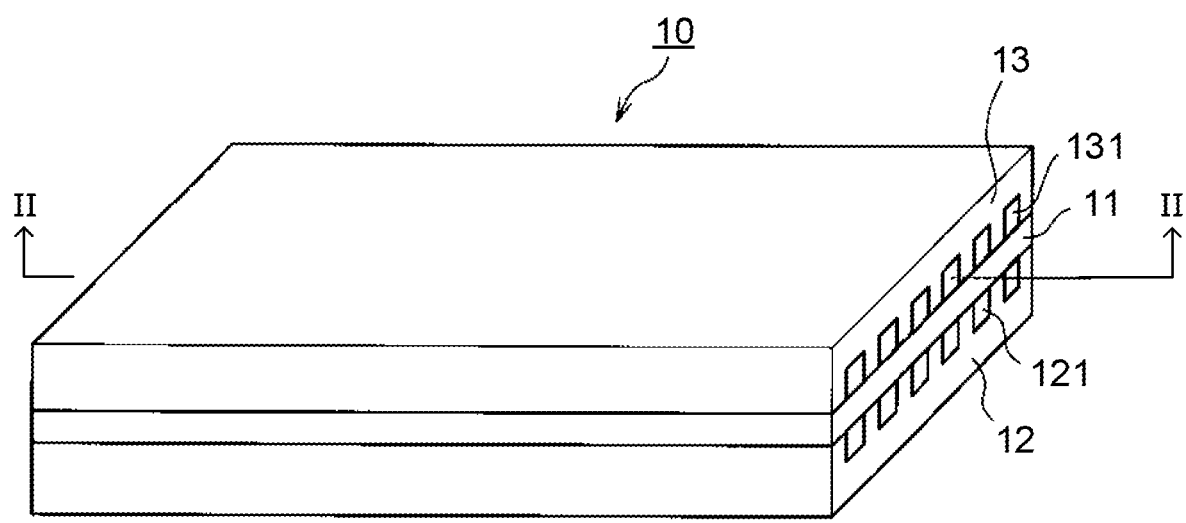
FIG. 1 is a perspective diagram illustrating a membrane electrode assembly of a fuel cell system according to an embodiment.
Figure 2:
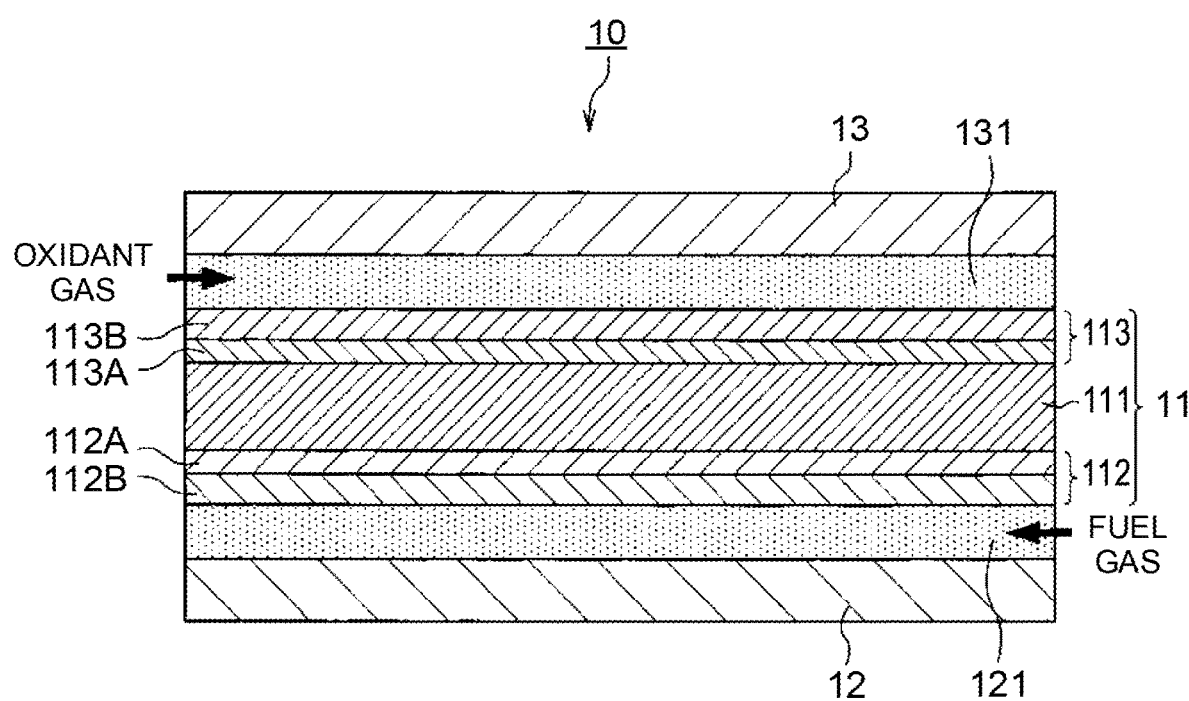
FIG. 2 is a cross-sectional diagram viewed from the II-II line of FIG. 1.

FIGS. 1 and 2 are diagrams explaining the configuration of a fuel cell 10 that constitutes a fuel cell system 100 (FIG. 3) according to the present embodiment.

The fuel cell 10 includes a membrane electrode assembly (MEA 11) and anode and cathode separators 12 and 13 that are arranged to sandwich the MEA 11 therebetween.

The MEA 11 is configured to include an electrolyte membrane 111, an anode electrode 112, and a cathode electrode 113. The MEA 11 includes the anode electrode 112 on one side and the cathode electrode 113 on the other side of the electrolyte membrane 111.

The electrolyte membrane 111 is an ion exchange membrane having proton conductivity formed of fluorinated resin. The electrolyte membrane 111 shows good electrical conductivity in a wet state.

The anode electrode 112 includes a catalyst layer 112A and a gas diffusion layer 112B. The catalyst layer 112A is a member formed of platinum or carbon black particles carrying platinum etc. and is provided to be in contact with the electrolyte membrane 111. The gas diffusion layer 112B is placed outside the catalyst layer 112A. The gas diffusion layer 112B is a member formed of carbon cloth having gas diffusibility and electrical conductivity and is provided to be in contact with the catalyst layer 112A and the anode separator 12.

Similarly to the anode electrode 112, the cathode electrode 113 also includes a catalyst layer 113A and a gas diffusion layer 113B. The catalyst layer 113A is placed between the electrolyte membrane 111 and the gas diffusion layer 113B, and the gas diffusion layer 113B is placed between the catalyst layer 113A and the cathode separator 13.

The anode separator 12 is placed outside the gas diffusion layer 112B. The anode separator 12 includes a plurality of fuel gas flow channels 121 configured to supply fuel gas (anode gas, hydrogen gas) to the anode electrode 112. The fuel gas flow channels 121 are formed as a groove-like passage.

The cathode separator 13 is placed outside the gas diffusion layer 113B. The cathode separator 13 includes a plurality of oxidant gas flow channels 131 configured to supply oxidant gas (cathode gas, air) to the cathode electrode 113. The oxidant gas flow channels 131 are formed as a groove-like passage.

When using such the fuel cell 10 as a power source, a fuel cell stack 1 in which a plurality of the fuel cells 10 is stacked in accordance with required electric power is used as the power source. For example, because required electric power is large when the fuel cell 10 is used as a power source for an automobile, the fuel cell stack 1 (FIG. 3) is formed by stacking several hundred of the fuel cells 10. The fuel cell system 100 (FIG. 3) that supplies fuel gas and oxidant gas to the fuel cell stack 1 is configured to take out electric power according to the request.

[Configuration of Fuel Cell System]

Figure 3:
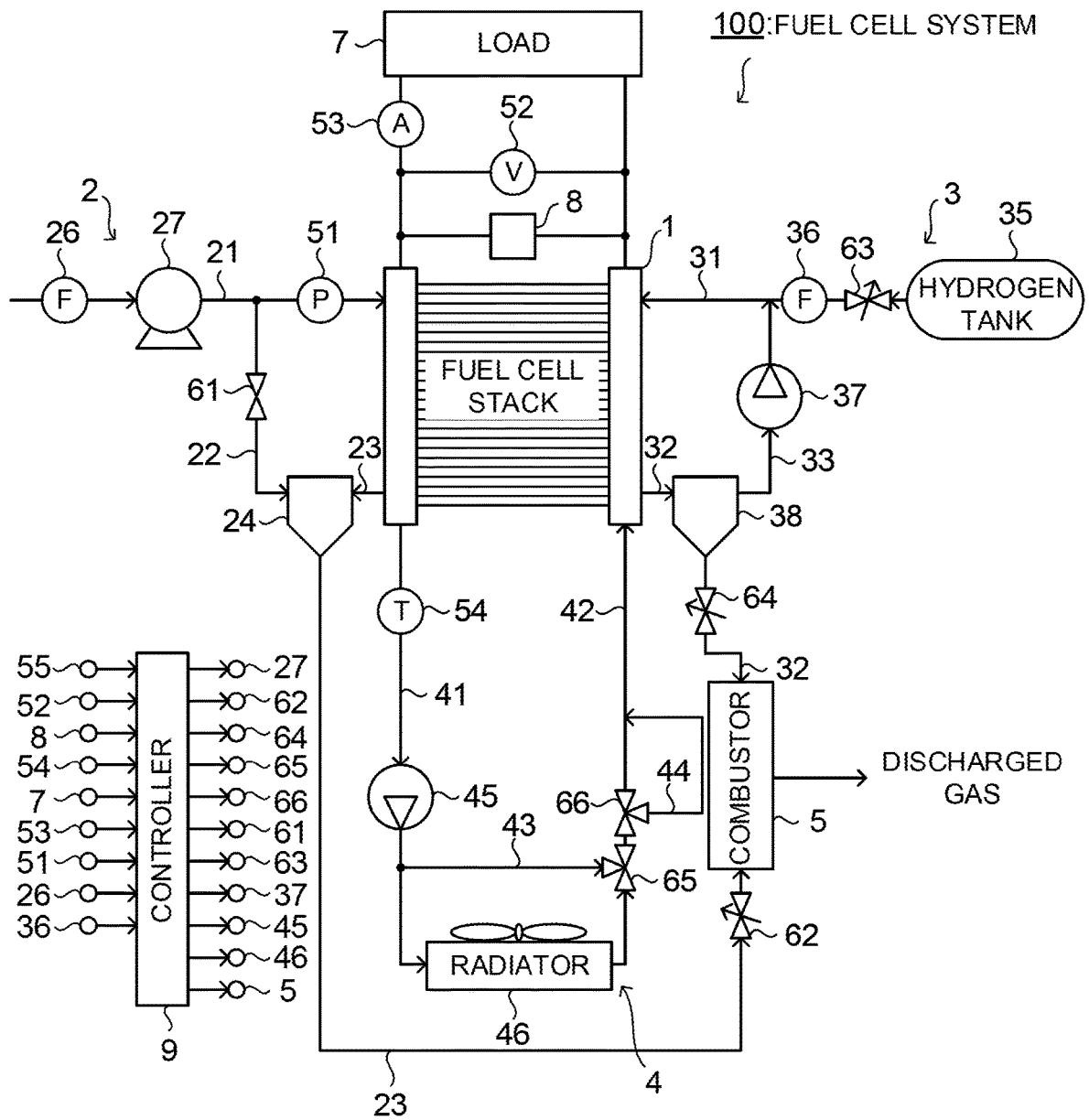
FIG. 3 is a schematic diagram illustrating the main configuration of the fuel cell system according to the present embodiment.

FIG. 3 is a schematic diagram illustrating the fuel cell system 100 according to the embodiment of the present invention.

The fuel cell system 100 includes the fuel cell stack 1 (fuel cell body), an oxidant gas supply/discharge apparatus 2 (oxidant supply system), a fuel gas supply/discharge apparatus 3 (fuel supply system), a cooling water circulation apparatus 4 (cooling water circulation system), a combustor 5, a controller 9 (power generation control unit 90 and catalyst deterioration recovery unit 91), and the like, and is configured by connecting the fuel cell stack 1 to a load 7. The fuel cell system 100 that can recover the catalyst deterioration of the fuel cell stack 1 (the fuel cell 10) is constructed by mounting the controller 9 on the fuel cell stack 1.

The fuel cell stack 1 is a stacked battery in which the plurality of the fuel cells 10 (unit cell) is stacked. The fuel cell stack 1 receives the supply of fuel gas and oxidant gas to generate electricity. As output terminals for taking out electric power, the fuel cell stack 1 includes an anode-electrode side terminal and a cathode-electrode side terminal.

The oxidant gas supply/discharge apparatus 2 supplies oxidant gas to the fuel cell stack 1 and supplies oxidant offgas (cathode offgas) discharged from the fuel cell stack 1 to the combustor 5. The oxidant gas supply/discharge apparatus 2 includes an oxidant gas supply passage 21, an oxidant gas bypass passage 22, and an oxidant gas discharge passage 23.

An air flow meter 26, a compressor 27 (flow rate adjusting unit), and a pressure sensor 51 are arranged in the oxidant gas supply passage 21. One end of the oxidant gas supply passage 21 is connected to an oxidant gas inlet of the fuel cell stack 1.

The air flow meter 26 detects a flow rate of oxidant gas to be supplied to the fuel cell stack 1.

The compressor 27 is placed in the oxidant gas supply passage 21 on the downstream side from the air flow meter 26. The operation of the compressor 27 is controlled by the controller 9, and the compressor 27 pumps the oxidant gas in the oxidant gas supply passage 21 to supply the gas to the fuel cell stack 1.

The pressure sensor 51 is placed in the oxidant gas supply passage 21 on the downstream side from the branching portion with the oxidant gas bypass passage 22. The pressure sensor 51 detects the pressure of the oxidant gas to be supplied to the fuel cell stack 1. The oxidant gas pressure detected by the pressure sensor 51 represents the pressure of the entire cathode system including the oxidant gas flow channels 131 (FIGS. 1 and 2) etc. of the fuel cell stack 1.

The oxidant gas discharge passage 23 is a passage through which oxidant offgas discharged from the fuel cell stack 1 flows. The oxidant offgas is mixed gas including oxidant gas, water vapor generated by an electrode reaction, and the like. One end of the oxidant gas discharge passage 23 is connected to an oxidant gas outlet of the fuel cell stack 1, and the other end is connected to an inlet of the combustor 5. A water separator 24 configured to separate water vapor from the oxidant offgas is placed in the oxidant gas discharge passage 23. Moreover, an air pressure control valve 62 (pressure adjusting unit) configured to adjust the flow rate of the oxidant offgas is placed on the downstream side from the water separator 24 in the oxidant gas discharge passage 23 and on the upstream side from the combustor 5. The air pressure control valve 62 is a valve that adjusts the pressure (back pressure) of oxidant offgas (oxidant gas).

The oxidant gas bypass passage 22 is a passage configured to branch off from the oxidant gas supply passage 21 and join the upstream side from the water separator 24 in the oxidant gas discharge passage 23. In other words, the oxidant gas bypass passage 22 is a passage configured to supply oxidant gas to the combustor 5 without making the oxidant gas pass through the fuel cell stack 1. A bypass valve 61 is placed in the oxidant gas bypass passage 22. The bypass valve 61 is controlled to be opened and closed by the controller 9 to adjust the flow rate of oxidant gas passing through the oxidant gas bypass passage 22 and to consequently adjust an amount of oxygen to be supplied to the combustor 5.

Next, the fuel gas supply/discharge apparatus 3 will be explained.

The fuel gas supply/discharge apparatus 3 supplies fuel gas (anode gas, hydrogen gas) to the fuel cell stack 1 and supplies fuel offgas (anode offgas) discharged from the fuel cell stack 1 to the combustor 5. The fuel gas supply/discharge apparatus 3 includes a hydrogen tank 35, a fuel gas supply passage 31, a hydrogen supply valve 63, a hydrogen flow meter 36, a fuel gas discharge passage 32, a water separator 38, a fuel gas circulation passage 33, a hydrogen circulating pump 37, and a purge valve 64 (humidity degree adjusting unit).

The hydrogen tank 35 is a container that stores fuel gas to be supplied to the fuel cell stack 1 while maintaining the gas in a high-pressure state.

The fuel gas supply passage 31 is a passage configured to supply the fuel gas discharged from the hydrogen tank 35 to the fuel cell stack 1. One end of the fuel gas supply passage 31 is connected to the hydrogen tank 35 and the other end is connected to a fuel gas inlet of the fuel cell stack 1.

The hydrogen supply valve 63 is placed in the fuel gas supply passage 31 on the downstream side from the hydrogen tank 35. The hydrogen supply valve 63 is controlled to be opened and closed by the controller 9 to adjust the pressure of the fuel gas to be supplied to the fuel cell stack 1.

The hydrogen flow meter 36 is provided in the fuel gas supply passage 31 on the downstream side from the hydrogen supply valve 63. The hydrogen flow meter 36 detects the flow rate of fuel gas to be supplied to the fuel cell stack 1. The flow rate detected by the hydrogen flow meter 36 represents the flow rate of the entire anode system including the fuel gas flow channels 121 (FIGS. 1 and 2) of the fuel cell stack 1. In addition, a hydrogen pressure gage may be placed instead of the hydrogen flow meter 36. In this case, a pressure detected by the hydrogen pressure gage represents the pressure of the entire anode system.

The fuel gas discharge passage 32 is a passage through which the fuel offgas discharged from the fuel cell stack 1 flows. One end of the fuel gas discharge passage 32 is connected to a fuel gas outlet of the fuel cell stack 1 and the other end is connected to a fuel gas inlet of the combustor 5. The fuel offgas contains fuel gas that is not used by the electrode reaction, impurity gas such as nitrogen leaked from the oxidant gas flow channels 131 (FIGS. 1 and 2) to the fuel gas flow channels 121 (FIGS. 1 and 2), moisture, and the like.

The water separator 38 configured to separate moisture from the fuel offgas is placed in the fuel gas discharge passage 32. The purge valve 64 is provided in the fuel gas discharge passage 32 on the downstream side from the water separator 38. The purge valve 64 (humidity degree adjusting unit) is controlled to be opened and closed by the controller 9 to adjust the flow rate of fuel offgas (fuel gas) to be supplied to the combustor 5 from the fuel gas discharge passage 32. The moisture as well as the fuel offgas are discharged by opening the purge valve 64. For this reason, the humidity degree of the fuel gas touching the MEA 11 is decreased by making the opening degree of the purge valve 64 larger to increase the discharge amount of the fuel offgas. Conversely, the humidity degree of the fuel gas touching the MEA 11 is raised by making the opening degree of the purge valve 64 smaller to decrease the discharge amount of the fuel offgas.

The fuel gas circulation passage 33 branches off from the fuel gas discharge passage 32 on the downstream side from the water separator 38 and joins the fuel gas supply passage 31 on the downstream side from the hydrogen flow meter 36. The hydrogen circulating pump 37 is placed in the fuel gas circulation passage 33. The operation of the hydrogen circulating pump 37 is controlled by the controller 9.

Next, the cooling water circulation apparatus 4 will be explained.

The cooling water circulation apparatus 4 includes a cooling water discharge passage 41, a cooling water pump 45, a radiator 46, a cooling water supply passage 42, a water temperature sensor 54 (specific operating state detecting means), a bypass passage 43, a bypass valve 65 (temperature adjusting unit), a heating passage 44, and a bypass valve 66 (temperature adjusting unit).

The cooling water discharge passage 41 is a passage through which cooling water discharged from the fuel cell stack 1 passes. One end of the cooling water discharge passage 41 is connected to a cooling water outlet of the fuel cell stack 1 and the other end is connected to an inlet of the radiator 46.

The cooling water pump 45 is provided in the cooling water discharge passage 41. The operation of the cooling water pump 45 is controlled by the controller 9 to adjust the circulation amount of the cooling water.

The radiator 46 cools cooling water heated up by heat received from the fuel cell stack 1 by using heat exchange with the atmospheric air. In addition, although the air-cooled radiator 46 configured to cool cooling water by using heat exchange with the atmospheric air is employed in the present embodiment, the radiator 46 may employ a liquid-cooled radiator configured to cool cooling water by using heat exchange with a cooling medium.

The bypass passage 43 branches off from the cooling water discharge passage 41 on the downstream side from the cooling water pump 45 and on the upstream side from the radiator 46 and joins the cooling water supply passage 42 on the downstream side from the radiator 46. The bypass valve 65 is provided in a joining portion between the bypass passage 43 and the cooling water supply passage 42.

The bypass valve 65 is a three-way valve that is controlled to be opened and closed by the controller 9 to adjust the flow rate of cooling water passing through the radiator 46. The heating passage 44 branches off from the cooling water supply passage 42 and joins the cooling water supply passage 42 to enable the heat exchange of cooling water by using the combustor 5. The bypass valve 66 is a three-way valve that is provided at a branching point between the cooling water supply passage 42 and the heating passage 44. The bypass valve 66 is controlled to be opened and closed by the controller 9 to adjust the flow rate of cooling water passing through the heating passage 44.

The water temperature sensor 54 is placed in the cooling water discharge passage 41 on the upstream side from the cooling water pump 45.

Moreover, a voltage sensor 52 and a current sensor 53 are provided in the fuel cell stack 1. The voltage sensor 52 (deterioration detecting unit) detects the output voltage of the fuel cell stack 1, namely, a voltage between terminals of the anode-electrode side terminal and the cathode-electrode side terminal. The voltage sensor 52 may be configured to detect a voltage for each cell of the fuel cells 10 or may be configured to detect a voltage for every plural cells of the fuel cells 10.

The current sensor 53 is provided in a circuit that connects the fuel cell stack 1 and the load 7 to detect an output current taken out from the fuel cell stack 1.

Similarly to the voltage sensor 52, an impedance measuring device 8 (specific operating state detecting means, wetness degree detecting means) is connected to the anode-electrode side terminal and the cathode-electrode side terminal. The impedance measuring device 8 applies an alternating voltage to the fuel cell stack 1 to measure the internal impedance of the fuel cell stack 1 from this alternating voltage and an alternating current taken out from the fuel cell stack 1.

The combustor 5 reacts oxygen in oxidant gas and hydrogen in anode offgas by using a platinum catalyst for example to obtain heat.

The controller 9 is configured by a microcomputer that includes a central processing unit (CPU), a read-only memory (ROM), a random-access memory (RAM), and an input-output interface (I/O interface). The controller 9 may be configured by a plurality of microcomputers. Signals from a timer 55, the voltage sensor 52, the impedance measuring device 8, the water temperature sensor 54, the load 7, the current sensor 53, the pressure sensor 51, the air flow meter 26, and the hydrogen flow meter 36 are input into the controller 9. Moreover, the controller 9 outputs control signals to the compressor 27, the air pressure control valve 62, the purge valve 64, the bypass valve 65, the bypass valve 66, the bypass valve 61, the hydrogen supply valve 63, the hydrogen circulating pump 37, the cooling water pump 45, the radiator 46, and the combustor 5.

If a voltage detected by the voltage sensor 52 is maintained not less than a predetermined threshold (specific rated voltage) of the fuel cell stack 1, the controller 9 (selecting unit 94 to be described later) determines that the poisoning by CO is not present on the catalyst layer 112A (FIGS. 1 and 2). On the other hand, if a voltage detected by the voltage sensor 52 becomes lower than the predetermined threshold (specific rated voltage) due to the procession of a voltage drop (degree of deterioration) of the output voltage of the fuel cell stack 1, the controller 9 can determine that the poisoning by CO occurs. In addition, a rated voltage can also be made constant regardless of the passage of time, but may be an output voltage value that is decreased with the aged deterioration of the fuel cell stack 1 on the condition that the deterioration of the catalyst layer 112A caused by the poisoning is not present.

Moreover, the controller 9 (selecting unit 94 to be described later) determines that the wetness degree (water content) of the MEA 11 is further decreased as an impedance detected by the impedance measuring device 8 becomes higher, and conversely determines that the wetness degree of the MEA 11 is further increased as the impedance becomes lower. Then, the controller can determine that the MEA 11 of the fuel cell 10 is in a wet state if the impedance is lower than a predetermined threshold, and determine that the MEA 11 is in a dry state if the impedance is not less than the predetermined threshold. Furthermore, the controller 9 (selecting unit 94 to be described later) can estimate the temperature of the MEA 11 depending on a temperature measured by the water temperature sensor 54.

The load 7 is, for example, a device that constitutes a vehicle equipped with the fuel cell system 100, and includes a DC-DC converter, a motor (inverter), a battery, auxiliary machinery, and the like.

[Poisoning Mechanism]

Next, carbon monoxide (CO) poisoning of an anode catalyst (e.g., platinum) carried in the catalyst layer 112A of the anode electrode 112 will be explained with reference to FIGS. 4 and 5.

CO to be adsorbed to the anode catalyst is contained in fuel gas and/or is generated in the anode electrode 112.

Figure 4:
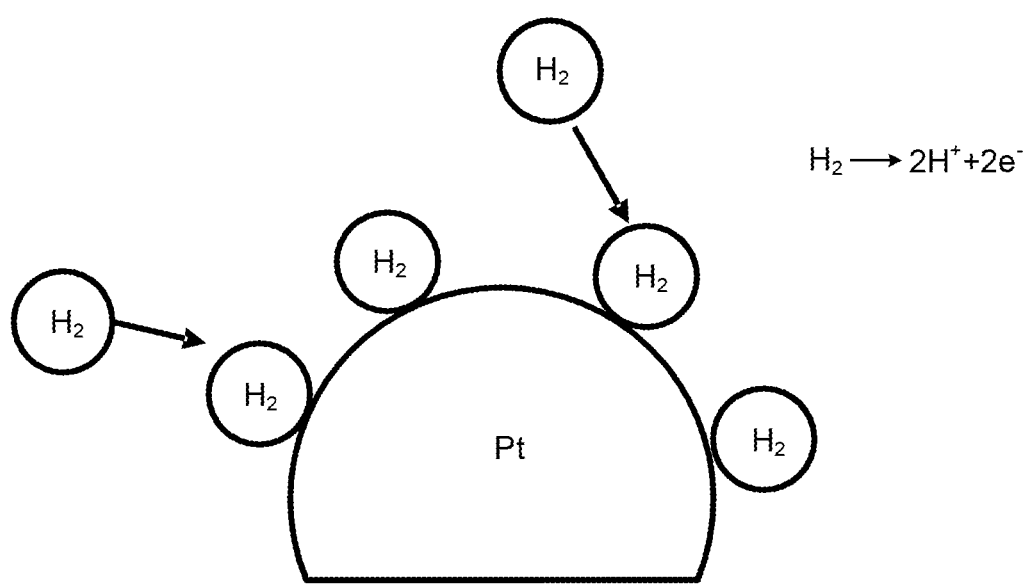
FIG. 4 is a diagram illustrating a reaction on an anode catalyst on which CO poisoning does not occur.

As illustrated in FIG. 4, in a state in which the CO poisoning does not occur, namely, in a normal state, hydrogen contained in fuel gas causes an electrode reaction (Formula (1)).

$$H_2 \rightarrow 2H^+ + 2e^- \qquad (1)$$

Figure 5:
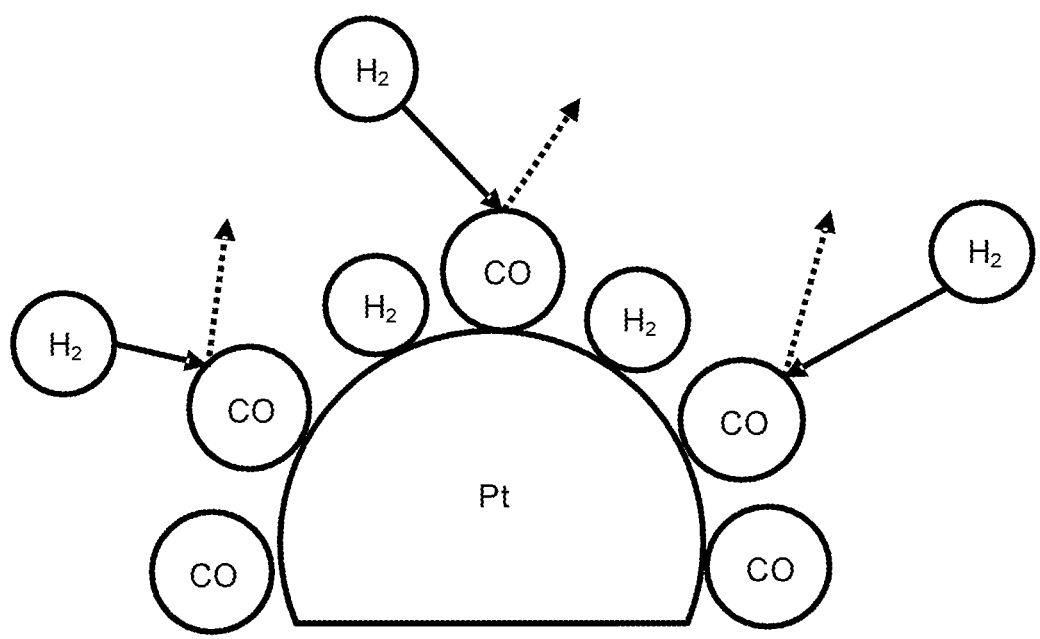
FIG. 5 is a diagram illustrating a reaction on the anode catalyst on which the CO poisoning occurs.

However, as illustrated in FIG. 5, an electrode reaction on the anode electrode 112 is blocked when the CO poisoning occurs on the anode catalyst. As a result, because the electric potential of the anode electrode 112 rises and thus a potential difference between the anode electrode 112 and the cathode electrode 113 decreases, the power performance of the fuel cell 10 is decreased.

To avoid performance degradation caused by such the CO poisoning, it is necessary to remove CO adsorbed to the anode catalyst to recover the anode catalyst from the CO poisoning. As a catalyst recovery process to recover the anode catalyst from the CO poisoning, there is conventionally known a method of supplying fuel gas containing oxygen to the anode catalyst and thus oxidizing CO adsorbed to the anode catalyst to eliminate CO from the anode catalyst.

Figure 6:
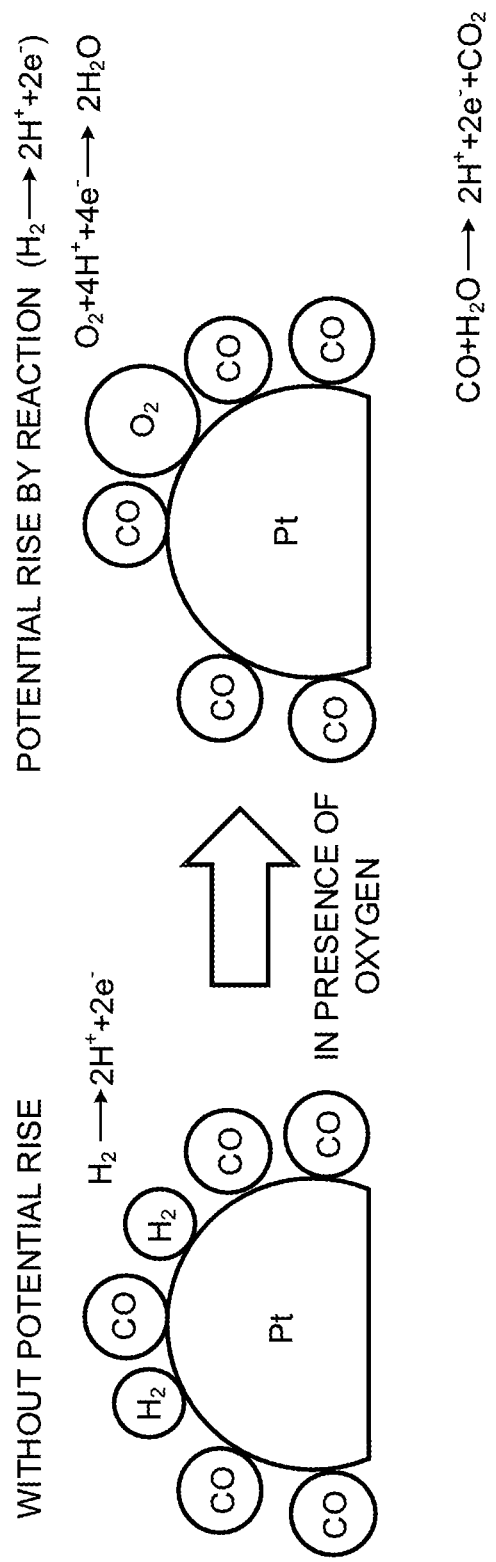
FIG. 6 is a diagram explaining the conventional thinking on recovery from the CO poisoning.

FIG. 6 is a diagram explaining the conventional thinking on the catalyst recovery process.

Conventionally, a mechanism for recovering an anode catalyst from CO poisoning by supplying oxygen has been considered as described below.

When fuel gas containing oxygen is supplied to the anode electrode 112, a reaction of Formula (2) occurs to consume electrons generated from the reaction of Formula (1) besides the electrode reaction of Formula (1) described above and thus the electric potential of the anode electrode is raised.

Then, when the electric potential of the anode electrode 112 is raised by the reaction of Formula (2), CO adsorbed to the anode catalyst is oxidized by the reaction of Formula (3).

It has been considered that the oxidation reaction of CO by Formula (3) occurs after the electric potential of the anode electrode 112 is raised and all the hydrogen on the anode catalyst is consumed. For this reason, a sufficient amount of oxygen to raise the electric potential of the anode electrode 112 has been conventionally supplied up to the electric potential at which the oxidation reaction of CO occurs. However, because the reaction of Formula (2) to raise an electric potential is an exothermic reaction, the electrolyte membrane 111 is deteriorated by heat generated by the reaction and this results in the performance degradation of the fuel cell 10.

Moreover, when oxygen is contained in fuel gas, a local battery may be formed in the anode electrode 112 and carbon of the catalyst layer 112A (FIGS. 1 and 2) in the anode electrode 112 may be oxidized and corroded. Such the corrosion of carbon causes the output reduction of the fuel cell 10.

Figure 7:
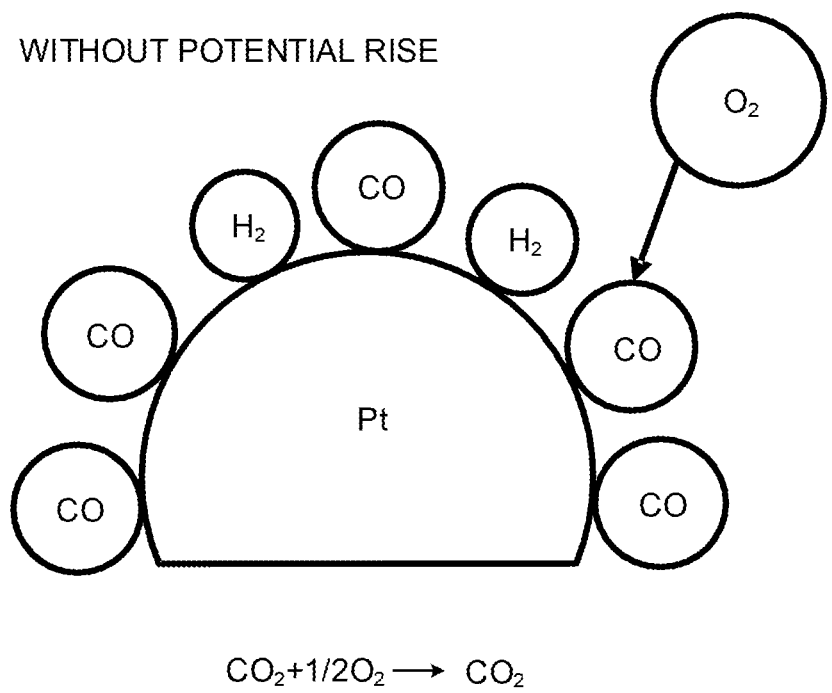
FIG. 7 is a diagram explaining a new finding on the recovery from the CO poisoning.

On the contrary, the inventors of the present invention have found that CO and oxygen react directly as illustrated in FIG. 7 and CO is eliminated from the anode catalyst even in a state where the electric potential of the anode electrode 112 is low.

If the catalyst recovery process can be performed even if the electric potential of the anode electrode 112 is not raised, an amount of oxygen contained in the fuel gas can be reduced in order to suppress the generation of heat causing catalyst deterioration. However, in the catalyst recovery process based on the conventional thinking, because a ratio of an amount of oxygen required for the recovery from the poisoning to an amount of fuel gas is small, for example, not more than several percent, the adjustment of the amount of oxygen to be contained was difficult. Therefore, to further reduce the amount of oxygen to be contained requires more difficult adjustment. In other words, in the method of making fuel gas contain oxygen, it was difficult to suppress the performance degradation of the anode electrode 112 and the fuel cell 10 accompanied with the catalyst recovery process.

Therefore, the present embodiment performs a catalyst recovery process to be below explained based on a new finding that oxygen directly reacts with CO to eliminate CO from the anode catalyst even in a state where the electric potential of the anode electrode 112 is low.

[Mechanism of Poisoning Resolution of Embodiment]

Figure 8:
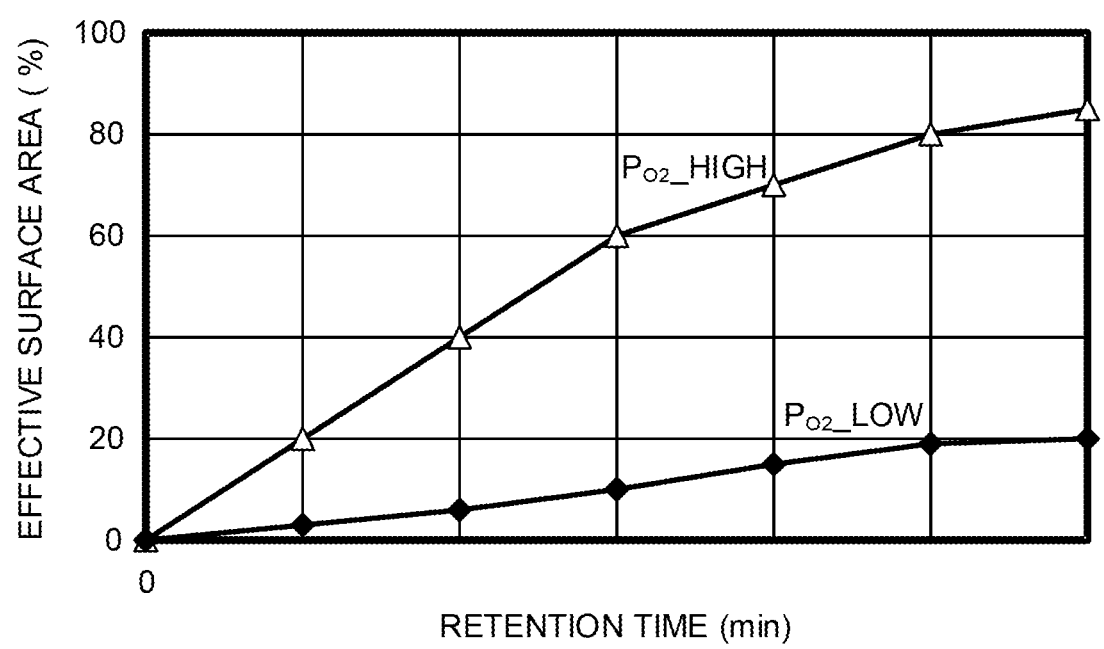
FIG. 8 is a diagram illustrating a relationship between an oxygen partial pressure and a recovery speed from the CO poisoning.

FIG. 8 is a diagram illustrating experimental results as the basis of the new finding described above. The vertical axis of FIG. 8 indicates an effective surface area ratio of the anode catalyst and the horizontal axis indicates a time. The effective surface area ratio is a ratio of an area contributing to an electrode reaction to the surface area of platinum acting as the anode catalyst. That is to say, the effective surface area ratio in a state where CO is not adsorbed is 100%. The effective surface area ratio can be estimated based on the voltage of the fuel cell 10, for example.

The experimental procedure is as follows. First, the CO poisoning is performed on the anode catalyst so that the effective surface area ratio becomes 0%. Then, the change in the effective surface area ratio is monitored while supplying hydrogen to an anode and mixed gas of oxygen and nitrogen to a cathode and maintaining the state of no power generation (OCV). FIG. 8 illustrates experimental results of two patterns in which the cathode-side oxygen partial pressures are different. The oxygen partial pressures are like "$P_{O2\_high} > P_{O2\_low}$".

As illustrated in FIG. 8, the effective surface area ratio that was 0% at the beginning of the experiment gradually grows larger with the passage of time. From this, it turns out that CO is oxidized by oxygen cross-leaked from the cathode side to the anode side to be detached from the anode catalyst.

From FIG. 8, it turns out that the higher one of the cathode-side oxygen partial pressures has a bigger increase speed of the effective surface area ratio. A permeation flux F represented by Equation (4) is known as an index to evaluate the permeation performance of a membrane. It means that a permeation amount is more as the permeation flux F is larger.

$$\text{Permeation flux } F = \text{Oxygen permeation coefficient } k \times \text{Partial pressure difference } dP \quad (4)$$

Figure 9:
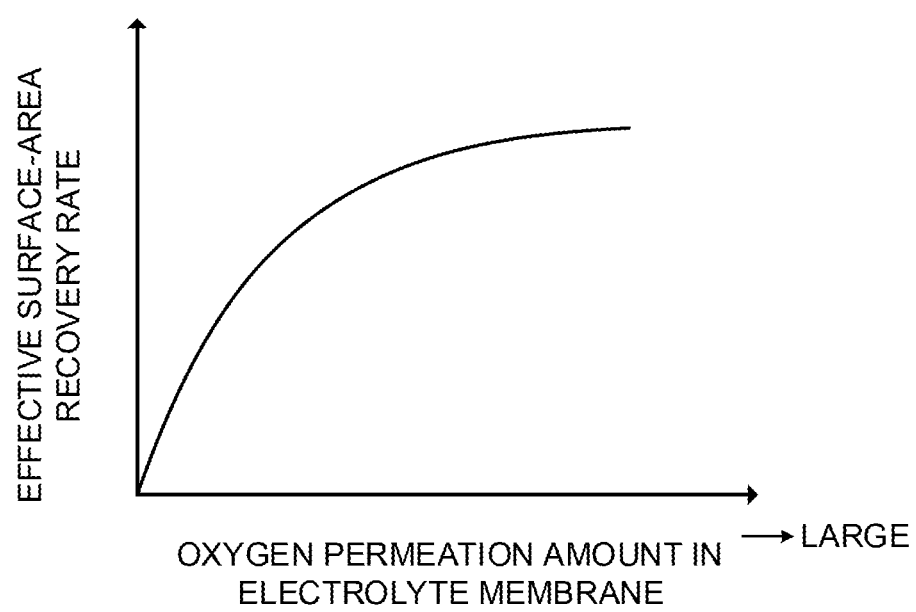
FIG. 9 is a diagram illustrating a relationship between an oxygen permeation amount of an electrolyte membrane and an effective surface-area recovery rate of a catalyst layer.

That the permeation flux F of oxygen is large means that the oxygen permeation coefficient k and/or the partial pressure difference dP are/is large in Equation (4). Therefore, it turns out that the recovery from CO poisoning can be more promptly performed as the permeation flux F of oxygen is larger, namely, an amount of cross-leaked oxygen is more. FIG. 9 illustrates the above contents as a drawing. The vertical axis of FIG. 9 indicates an effective surface-area recovery rate, namely, a degree of recovery from the CO poisoning. The horizontal axis of FIG. 9 indicates an oxygen permeation amount in the electrolyte membrane 111. As illustrated in FIG. 9, as the oxygen permeation amount in the electrolyte membrane 111 becomes more, the effective surface-area recovery rate grows larger.

As described above, if the catalyst recovery process is a method of using oxygen cross-leaked from the cathode side to the anode side, a probability that oxygen reacts to hydrogen on the anode catalyst is low as compared to the case where oxygen is contained in fuel gas. For this reason, it is possible to suppress the deterioration of the electrolyte membrane 111 (MEA 11) due to heat generated by the reaction between hydrogen and oxygen.

Figure 10:
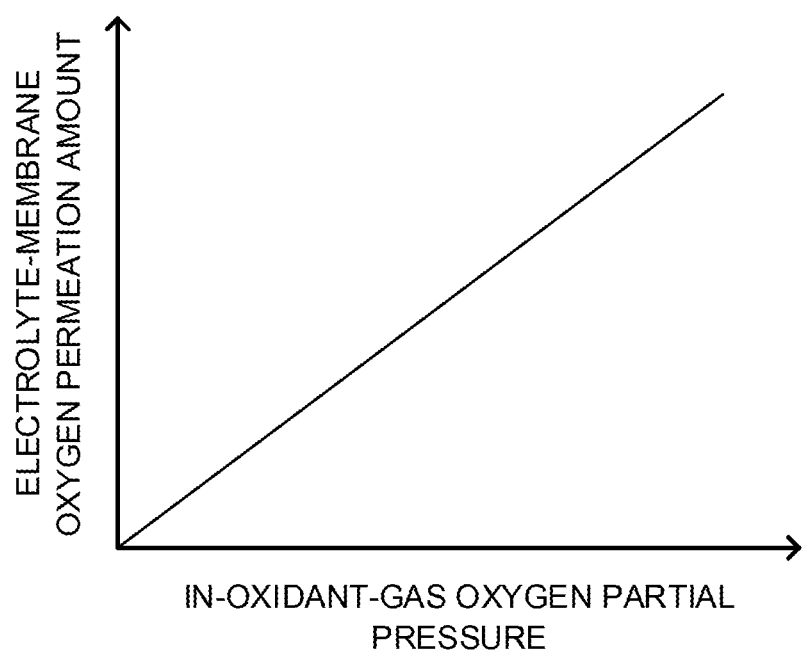
FIG. 10 is a diagram illustrating a relationship between an in-oxidant-gas oxygen partial pressure and an electrolyte-membrane oxygen permeation amount.

FIG. 10 is a diagram illustrating a relationship between an in-oxidant-gas oxygen partial pressure and an electrolyte-membrane oxygen permeation amount. As shown in FIG.

10, as the in-oxidant-gas oxygen partial pressure (partial pressure difference dP) is more increased, the oxygen permeation amount is more increased substantially linearly.

Figure 11:
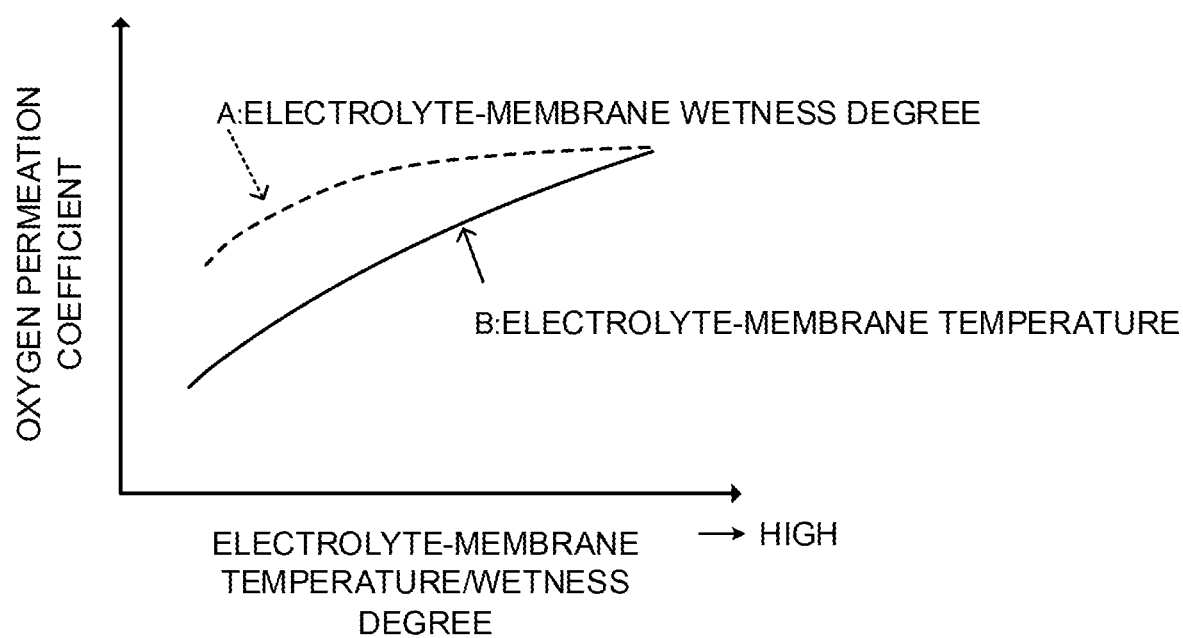
FIG. 11 is a diagram illustrating a relationship between an electrolyte-membrane temperature and an oxygen permeation coefficient and a relationship between an electrolyte-membrane wetness degree and the oxygen permeation coefficient.

FIG. 11 a diagram illustrating a relationship between an electrolyte-membrane temperature and the oxygen permeation coefficient k and a relationship between an electrolyte-membrane wetness degree and the oxygen permeation coefficient k. As illustrated in FIG. 11, a curved line (A) indicating a relationship between the wetness degree of the electrolyte membrane 111 and the oxygen permeation coefficient k monotonically increases in accordance with the increase of the wetness degree. Moreover, a curved line (B) indicating a relationship between the temperature of the electrolyte membrane 111 and the oxygen permeation coefficient k monotonically increases in accordance with the rise of the temperature. In case of the curved line (A), its slope is large in the stage where the wetness degree is low, but its slope becomes smaller to be saturated as the wetness degree becomes higher. On the other hand, in case of the curved line (B), as the temperature shifts from a low stage to a high stage, its slope becomes smaller but is not saturated to generally maintain a linear change.

From FIG. 11, in the case where the wetness degree of the electrolyte membrane 111 (MEA 11) is low and the temperature of the electrolyte membrane 111 is low when increasing the oxygen permeation coefficient k, it turns out that it is efficient to perform an operation for increasing the wetness degree of the electrolyte membrane 111. On the other hand, when the wetness degree of the electrolyte membrane 111 is high, it is difficult to increase the oxygen permeation coefficient k even if the wetness degree is further increased, and thus it turns out that it is preferably efficient to perform an operation for raising the temperature of the electrolyte membrane 111.

Figure 12:
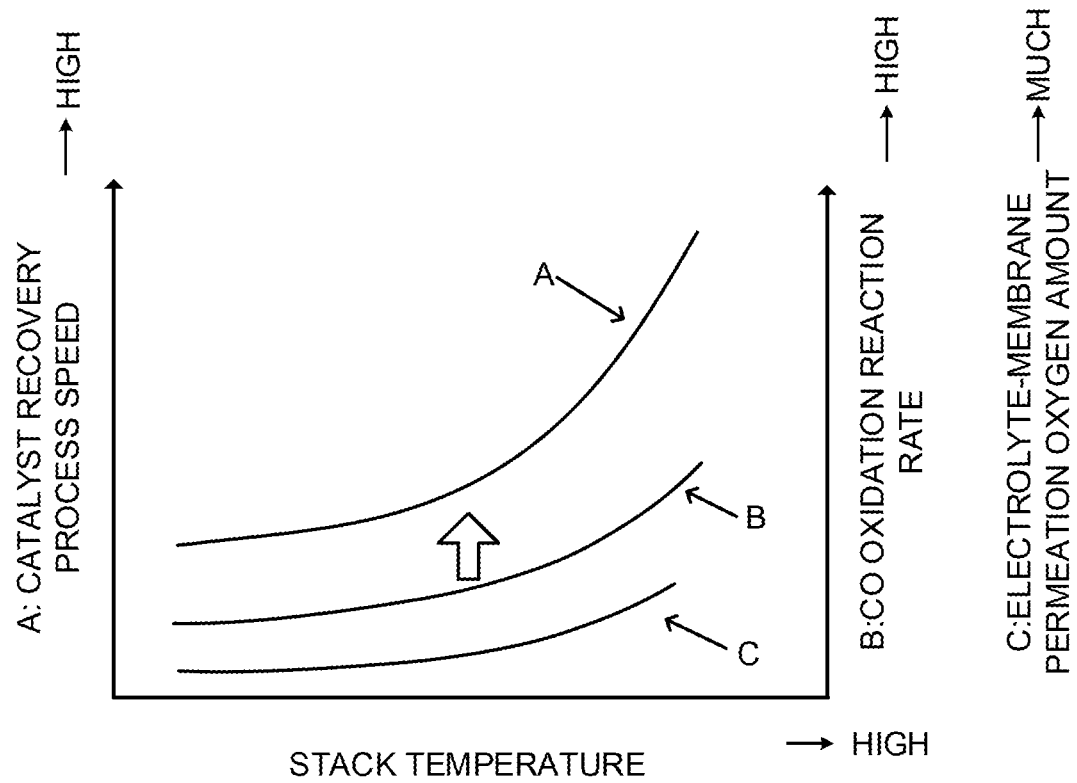
FIG. 12 is a diagram illustrating a relationship between a stack temperature and a catalyst recovery process speed, a relationship between the stack temperature and a CO-oxidation reaction rate, and a relationship between the stack temperature and an electrolyte-membrane permeation oxygen amount.

FIG. 12 a diagram illustrating a relationship between a stack temperature and a catalyst recovery process speed, a relationship between the stack temperature and a CO-oxidation reaction rate, and a relationship between the stack temperature and an electrolyte-membrane permeation oxygen amount. Herein, the stack temperature corresponds to the temperature of the electrolyte membrane 111 (MEA 11) of the fuel cell stack 1. As illustrated in FIG. 12, a curved line (B) indicating a relationship between the stack temperature and the CO-oxidation reaction rate and a curved line (C) indicating a relationship between the stack temperature and the permeation oxygen amount of the electrolyte membrane 111 are monotonically increased. However, it turns out that their slopes are small in a low-temperature range and their slopes grow larger in a high-temperature range. A curved line (A) indicating a relationship between the stack temperature and the catalyst recovery process speed is expressed by the product of the curved line (B) and the curved line (C). The curved line (A) indicates the same trend as the curved line (B) and the curved line (C).

The trends of the permeation oxygen amount indicated by the curved line (C) of FIG. 12 and the oxygen permeation coefficient k indicated by the curved line (B) of FIG. 11 are different from each other. As a result, the oxygen permeation coefficient k has a property that the coefficient is raised while being slightly saturated along with the rise of the stack temperature. On the other hand, the effective surface area of the electrolyte membrane 111, which oxygen can permeate, has a property that the surface area is raised exponentially along with the rise of the stack temperature after a certain temperature.

Moreover, although the rise in the temperature of the electrolyte membrane 111 and the increase in the wetness degree of the electrolyte membrane 111 can be simultaneously performed, the curved lines (A) to (C) are shifted upward in the vertical-axis direction of FIG. 12 when increasing the wetness degree of the electrolyte membrane 111 in FIG. 12.

From FIGS. 10 to 12, when increasing the permeation amount of oxygen in the electrolyte membrane 111 (MEA 11), it is preferable to perform control such as the following (1) to (4), for example.

(1) When the temperature of the electrolyte membrane 111 is low and the wetness degree of the electrolyte membrane 111 is low, it is efficient to perform control of increasing the wetness degree of the electrolyte membrane to increase the oxygen permeation coefficient k and/or control of increasing the pressure and flow rate of oxidant gas to increase the partial pressure difference dP.

(2) When the temperature of the electrolyte membrane 111 is low and the wetness degree of the electrolyte membrane 111 is high, it is efficient to perform control of increasing the pressure and flow rate of oxidant gas to increase the partial pressure difference dP.

(3) When the temperature of the electrolyte membrane 111 is high and the wetness degree of the electrolyte membrane 111 is low, it is efficient to perform at least one of control of raising the temperature of the electrolyte membrane 111 to increase the oxygen permeation coefficient k, control of increasing the wetness degree of the electrolyte membrane 111 to increase the oxygen permeation coefficient k, and control of increasing the pressure and flow rate of oxidant gas to increase the partial pressure difference dP.

(4) When the temperature of the electrolyte membrane 111 is high and the wetness degree of the electrolyte membrane 111 is high, it is efficient to perform control of raising the temperature of the electrolyte membrane 111 to increase the oxygen permeation coefficient k and/or control of increasing the pressure and flow rate of oxidant gas to increase the partial pressure difference dP.

In this regard, however, when the temperature of the electrolyte membrane 111 becomes lower than a predetermined threshold and when the wetness degree of the electrolyte membrane 111 becomes lower than a predetermined threshold (the membrane becomes a dry state), oxygen is difficult to permeate the electrolyte membrane 111. In this case, control of raising the temperature of the electrolyte membrane 111 and control of increasing the wetness degree of the electrolyte membrane 111 are individually performed preferentially.

In the present embodiment, to increase the partial pressure difference dP only needs to increase the flow rate of oxidant gas and/or increase the pressure of oxidant gas as described above. To increase the flow rate of oxidant gas only needs to increase the output of the compressor 27. Moreover, to increase the pressure of oxidant gas only needs to increase the output of the compressor 27 and/or decrease the opening degree of the air pressure control valve 62. In this regard, however, because the combustor 5 requires a predetermined amount of oxygen to combust the fuel gas (anode offgas), the opening degree of the air pressure control valve 62 cannot be below a certain value. In this case, the embodiment performs control of raising the output of the compressor 27 instead of the air pressure control valve 62 to increase the partial pressure difference dP of oxygen. On the other hand, because the flow rate of oxidant gas can no longer be increased by the compressor 27 when the output of the compressor 27 is the maximum, the embodiment increases the partial pressure difference dP of oxygen by decreasing the opening degree of the air pressure control valve 62 to increase the pressure (back pressure) of oxidant gas. The oxygen permeated from the cathode side by a catalyst deterioration recovery process is separated from the MEA 11 and is mixed into the fuel gas. For this reason, because an oxygen partial pressure in the fuel gas is raised, the partial pressure difference dP is decreased that much. Herein, a method of increasing (recovering) the partial pressure difference dP only needs to open the purge valve 64 to discharge the fuel gas (fuel offgas) containing oxygen and to supply new fuel gas from the hydrogen tank 35 to the anode-side flow channels of the fuel cell stack 1.

To increase the oxygen permeation coefficient k only needs to increase the wetness degree of the electrolyte membrane 111 (MEA 11) and/or raise the temperature of the electrolyte membrane 111 as described above. To increase the wetness degree of the electrolyte membrane 111 only needs to raise the humidity degree of the fuel gas, and this case only needs to decrease the opening degree of the purge valve 64.

Figure 13:
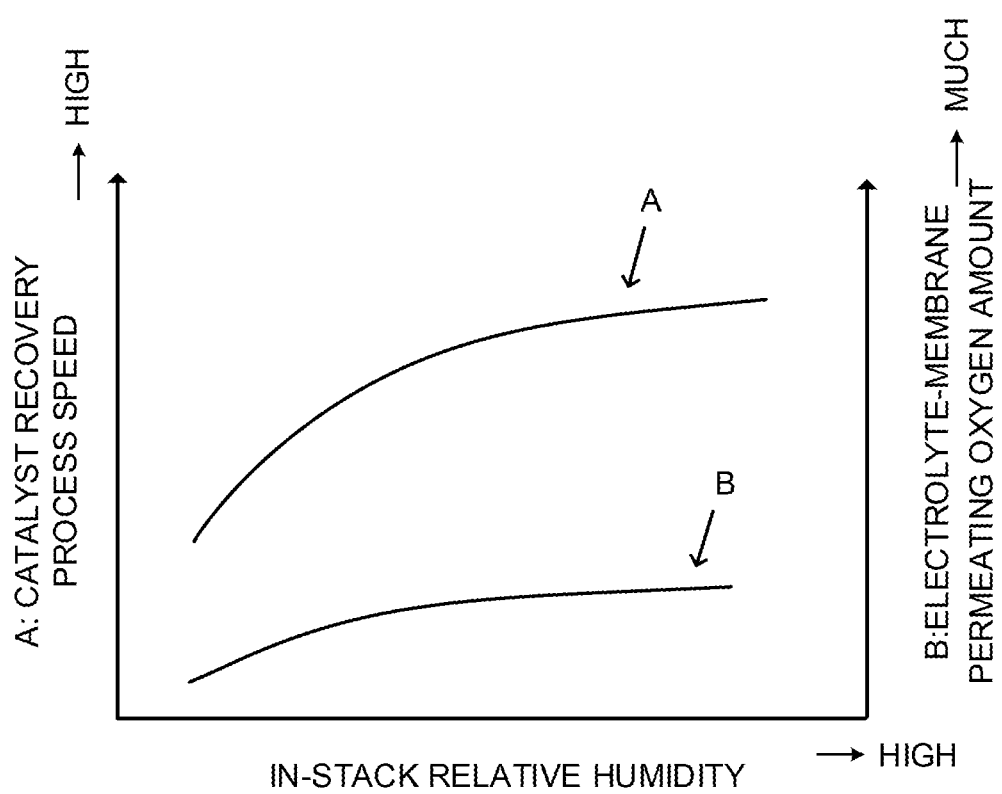
FIG. 13 a diagram illustrating a relationship between an in-stack relative humidity and the catalyst recovery process speed and a relationship between an in-stack relative temperature and the electrolyte-membrane permeation oxygen amount.

FIG. 13 a diagram illustrating a relationship between an in-stack relative humidity and the catalyst recovery process speed and a relationship between an in-stack relative temperature and the electrolyte-membrane permeation oxygen amount. As illustrated in FIG. 13, when raising the in-stack relative humidity, i.e. the humidity degree of the fuel gas, an amount of oxygen (A) permeating the electrolyte membrane 111 is increased and a processing speed (B) for the catalyst recovery is also raised. As a result, it turns out that a correlation is present between the humidity degree of the fuel gas and the wetness degree of the electrolyte membrane 111 (MEA 11).

Moreover, to raise the temperature of the electrolyte membrane 111 only needs to raise the temperature of the cooling water. In this case, the embodiment only needs to perform an operation of controlling the bypass valve 65 to decrease the supplied amount of cooling water to the radiator 46 or controlling the bypass valve 66 to circulate cooling water into the heating passage 44 and thus to increase the supplied amount of cooling water to be heated by the combustor 5.

Therefore, the controller 9 (selecting unit 94 to be described later) according to the present embodiment grasps the operating state (the cooling water temperature, the wetness degree of the MEA 11, and the like) of the fuel cell stack 1. Then, to increase the permeation amount of oxygen, the controller determines which control is optimum and selectively controls the optimum auxiliary machine while considering the control states of auxiliary machines (the compressor 27, the air pressure control valve 62, the purge valve 64, and the bypass valve 65 (or the bypass valve 66)) to be activated to cause the fuel cell stack 1 to generate electricity in the fuel cell system 100.

[Control Configuration of Embodiment]

Figure 14:
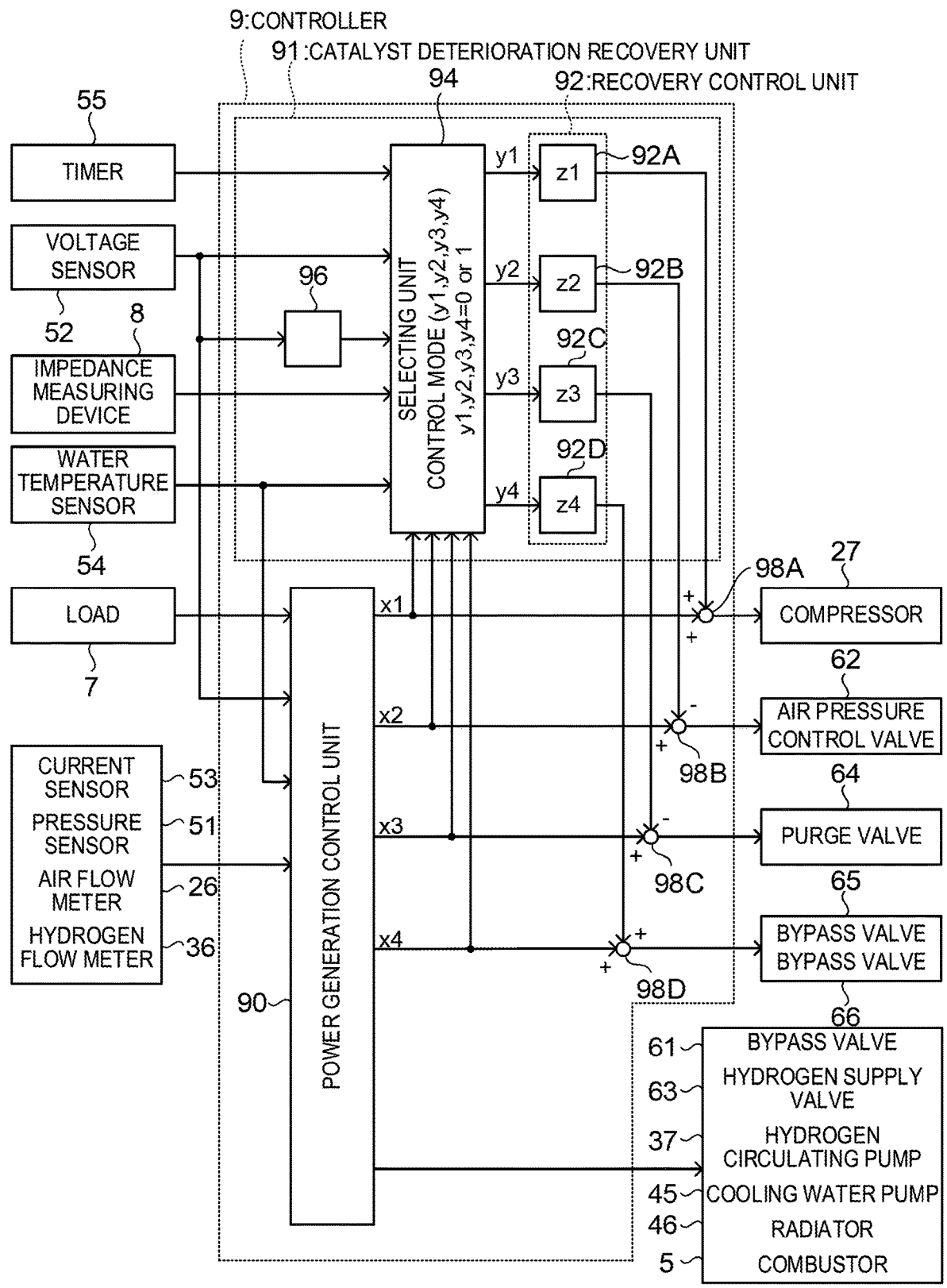
FIG. 14 is a diagram illustrating the control block of the fuel cell system according to the present embodiment.

FIG. 14 is a diagram illustrating the control block of the fuel cell system 100 (the controller 9) according to the present embodiment. FIG. 14 is a diagram illustrating the controller 9 illustrated in FIG. 3 in more detail. As illustrated in FIG. 14, the controller 9 is configured by the power generation control unit 90 (control device), the catalyst deterioration recovery unit 91 (catalyst deterioration recovery device), an adder 98A, a subtractor 98B, a subtractor 98C, and an adder 98D, and is to practice a control method aimed at the recovery of the catalyst deterioration according to the present embodiment. Herein, the power generation control unit 90 and the catalyst deterioration recovery unit 91 are configured as one in the controller 9, but may be respectively configured as separate devices.

The power generation control unit 90 is configured to output a signal by which the fuel cell system 100 generates electricity in accordance with a request signal input from the load 7. The power generation control unit 90 receives signals from the voltage sensor 52, the water temperature sensor 54, the current sensor 53, the air flow meter 26, the hydrogen flow meter 36, and the like. Moreover, the power generation control unit 90 outputs control signals to the compressor 27, the air pressure control valve 62, the purge valve 64, the bypass valve 65 (or the bypass valve 66), the bypass valve 61, the hydrogen supply valve 63, the hydrogen circulating pump 37, the cooling water pump 45, the radiator 46, and the combustor 5, to activate these auxiliary machines.

The power generation control unit 90 controls the output of the compressor 27 based on a signal x1, controls the opening degree of the air pressure control valve 62 based on a signal x2, controls the opening degree of the purge valve 64 based on a signal x3, and controls the opening degree of the bypass valve 65 (or the bypass valve 66) based on a signal x4. When the power generation request from the load 7 is not present, the power generation control unit 90 temporarily stops driving the hydrogen supply valve 63 and the hydrogen circulating pump 37, and temporarily stops outputting the signals x1 to x4.

The catalyst deterioration recovery unit 91 (catalyst deterioration recovery device, permeation-oxygen-amount increasing means) is configured by a recovery control unit 92 (oxidant supply means), the selecting unit 94 (oxidant supply control means, specific operating state detecting means, selecting means), and a voltage drop speed measuring unit 96. The recovery control unit 92 (recovery control units 92A to 92D) individually changes the control states of the compressor 27, the air pressure control valve 62, the purge valve 64, and the bypass valve 65 (or the bypass valve 66) that are performed by the power generation control unit 90, so as to increase the permeation amount of oxygen in oxidant gas permeating the electrolyte membrane 111 and thus to forcibly supply oxygen to the catalyst layer 112A. The recovery control units 92A to 92D respectively have signals (z1, z2, z3, z4) to change the respective control states. For example, the recovery control units receive signals of "1" (High) from the selecting unit 94 to be described later and respectively output the signals (z1, z2, z3, z4).

The recovery control unit 92A (supply-gas state adjusting means, second catalyst deterioration recovery means, flow-channel state control means, first recovery control unit) has the signal z1 and outputs the signal z1 to the adder 98A. The adder 98A outputs to the compressor 27 a signal (x1+z1) obtained by adding the signal x1 to be output to the compressor 27 by the power generation control unit 90 to the signal z1. Therefore, while the signal z1 is being output, the output of the compressor 27 is larger than the output set by the power generation control unit 90. As a result, the flow rate (or pressure) of oxidant gas to be supplied to the fuel cell stack 1 becomes larger than a flow rate controlled by the power generation control unit 90.

The recovery control unit 92B (supply-gas state adjusting means second catalyst deterioration recovery means, flow-channel state control means second recovery control unit) has the signal z2 and outputs the signal z2 to the subtractor 98B. The subtractor 98B outputs to the air pressure control valve 62 a difference (x2−z2) between the signal x2 to be output to the air pressure control valve 62 by the power generation control unit 90 and the signal z2. Therefore, while the signal z2 is being output, the opening degree of the air pressure control valve 62 becomes smaller than an opening degree set by the power generation control unit 90. As a result, the pressure (or flow rate) of oxidant gas to be supplied to the fuel cell stack 1 becomes larger than a pressure controlled by the power generation control unit 90.

The recovery control unit 92C (membrane-electrode-assembly state adjusting means, first catalyst deterioration recovery means, third recovery control unit) has the signal z3 and outputs the signal z3 to the subtractor 98C. The subtractor 98C outputs to the purge valve 64 a difference (x3−z3) between the signal x3 to be output to the purge valve 64 by the power generation control unit 90 and the signal z3. Therefore, while the signal z3 is being output, the opening degree of the purge valve 64 becomes smaller than an opening degree set by the power generation control unit 90. As a result, the discharge amount of the fuel gas (anode offgas) discharged from the fuel cell stack 1 becomes smaller than a discharge amount controlled by the power generation control unit 90.

The recovery control unit 92D (membrane-electrode-assembly state adjusting means, first catalyst deterioration recovery means, fourth recovery control unit) has the signal z4 and outputs the signal z4 to the adder 98D. The adder 98D outputs to the bypass valve 65 (or the bypass valve 66) a signal (x4+z4) obtained by adding the signal x4 to be output to the bypass valve 65 (or the bypass valve 66) by the power generation control unit 90 to the signal z4. Therefore, while the signal z4 is being output, the opening degree of the bypass valve 65 (or the bypass valve 66) becomes larger than an opening degree set by the power generation control unit 90. As a result, because the temperature of cooling water is raised, the temperature of the MEA 11 in the fuel cell stack 1 becomes higher than the temperature of the MEA 11 based on the control of the power generation control unit 90.

Herein, the catalyst deterioration recovery unit 91 changes the control states of the compressor 27, the air pressure control valve 62, the purge valve 64, and the bypass valve 65 (or the bypass valve 66), which are set by the power generation control unit 90, by using the recovery control units 92A to 92D. However, any controls performed by the recovery control units 92A to 92D do not decrease the power generation amount of the fuel cell stack 1 that is set by the power generation control unit 90. Therefore, the catalyst deterioration recovery unit 91 can perform the catalyst recovery process with respect to the catalyst layer 112A without nearly interfering with power generation control performed by the power generation control unit 90.

The selecting unit 94 determines the deterioration of the fuel cell stack 1 caused by the poisoning and the operating state of the fuel cell stack 1 through the estimation or detection, and selects and outputs a control mode (y1, y2, y3, y4) indicating a combination of recovery control of the recovery control units 92A to 92D. Then, the recovery control unit 92 performs control to resolve the poisoning of CO on the catalyst layer 112A (FIGS. 1 and 2) to recover a catalytic reaction. Herein, "y1 to y4" are either signal of zero (Low) and 1 (High). In the present embodiment, the number of control modes is "$2^4=16$".

The components that output the signals y1 and y2 within the selecting unit 94 respectively select as targets the recovery control units 92A and 92B, which increase the partial pressure difference dP of oxygen between the cathode side and the anode side of the electrolyte membrane 111, within the recovery control unit 92. Moreover, the components that output the signals y3 and y4 respectively select as targets the recovery control units 92C and 92D, which increase the oxygen permeation coefficient k in the electrolyte membrane 111, within the recovery control unit 92.

The selecting unit 94 is connected to the timer 55, the voltage sensor 52, the impedance measuring device 8, and the water temperature sensor 54. Moreover, the signals x1 to x4 output from the power generation control unit 90 are input into the selecting unit 94. In addition, when the power generation request from the load 7 is not present, the power generation control unit 90 stops driving the hydrogen supply valve 63 and the hydrogen circulating pump 37 and stops outputting the signals x1 to x4. However, when the signals z1 to z4 are input from the recovery control unit 92, the flow rate of oxidant gas by the compressor 27 is controlled based on the signal z1, the opening degree of the air pressure control valve 62 is controlled based on the signal z2, the opening degree of the purge valve 64 is controlled based on the signal z3, and the opening degree of the bypass valve 65 (or the bypass valve 66) is controlled based on the signal z4.

While the output voltage of the fuel cell stack 1 is maintained to be not less than a rated voltage, the selecting unit 94 selects a control mode (y1, y2, y3, y4)=(0, 0, 0, 0) to output the signal y1 to the recovery control unit 92A, the signal y2 to the recovery control unit 92B, the signal y3 to the recovery control unit 92C, and the signal y4 to the recovery control unit 92D. For this reason, while the output voltage of the fuel cell stack 1 is maintained to be not less than the rated voltage, any of the signals z1 to z4 is not output from the recovery control unit 92. However, when a voltage value detected by the voltage sensor 52 has a value lower than the rated voltage, the selecting unit selects an optimum control mode to increase the permeation amount of oxygen passing through the electrolyte membrane 111 based on the impedance (the wetness degree of the electrolyte membrane 111) input from the impedance measuring device 8 and the cooling water temperature (the temperature of the electrolyte membrane 111) input from the water temperature sensor 54. At this time, at least one of the signals y1 to y4 becomes 1 (High) and at least one of the signals z1 to z4 is output.

The voltage from the voltage sensor 52 is input into the voltage drop speed measuring unit 96. When the voltage drop of the output voltage of the fuel cell stack 1 is progressing above a predetermined speed, the voltage drop speed measuring unit 96 outputs a signal to the selecting unit 94. When the signal is received from the voltage drop speed measuring unit 96, the selecting unit 94 determines that the poisoning of the catalyst layer 112A is rapidly progressing, selects a control mode (y1, y2, y3, y4)=(1, 1, 1, 1), and outputs the signals of the control mode to the respective recovery control units 92A to 92D.

In addition, when the selecting unit 94 selects a control mode, control states, i.e. the signals x1 to x4, which are set by the power generation control unit 90, are considered. For example, when the output of the compressor 27 is the maximum by the signal x1, the signal y1 does not become 1 (High). When the opening degree of the air pressure control valve 62 is the minimum by the signal x2, the signal y2 does not become to 1 (High). When the opening degree of the purge valve 64 is the minimum value of the opening degree, at which oxygen required by the combustor 5 can be supplied, by the signal x3, the signal y3 does not become to 1 (High). When the opening degree of the bypass valve 65 (or the bypass valve 66) is maximum by the signal x4, the signal y4 does not become to 1 (High).

After that, when a voltage detected by the voltage sensor 52 reaches the rated voltage of the fuel cell stack 1 or when the rise of a voltage value is stopped, the selecting unit 94 determines that the poisoning on the catalyst layer 112A is resolved, selects a control mode (y1, y2, y3, y4)=(0, 0, 0, 0), and outputs the signals of the control mode to the respective recovery control units 92A to 92D. As a result, it is possible to restore the control states of the fuel cell stack 1.

The other method of activating the selecting unit 94 may be a method of considering that the deterioration due to poisoning is occurring (even when the deterioration does not occur) when a predetermined time (predetermined number of days) has passed by the timer 55 to activate the selecting unit 94. In this case, the selecting unit 94 considers that the poisoning of the catalyst layer 112A is resolved and the output voltage of the fuel cell stack 1 is recovered above the rated voltage after performing a reaction recovery process through the recovery control units 92A to 92D for a predetermined time. Then, the selecting unit 94 may select a control mode (y1, y2, y3, y4)=(0, 0, 0, 0) and outputs the signals of the control mode to the respective recovery control units 92A to 92D.

Moreover, the other method may be a method of considering that the deterioration by poisoning is occurring (even when the deterioration does not occur) if the cumulative consumption amount of fuel gas reaches a predetermined amount to activate the selecting unit 94. This is based on a method of previously assuming CO concentration in fuel gas and presuming that contained CO is adsorbed onto the anode catalyst if predetermined-amount fuel gas is consumed.

There is also a method of certainly activating the selecting unit 94 at the time of startup of the fuel cell system 100. This is a method of considering that CO adsorbed during the previous operation remains on the anode catalyst (even when CO does not remain) at the time of startup of the fuel cell system 100. In this case, whether to determine that the anode catalyst is deteriorated due to poisoning during the initial computation after the system startup may be decided in accordance with the previous operating time and/or a time from the previous operation end to the present operation start. Moreover, there is also a method of determining that the anode catalyst is deteriorated due to poisoning to activate the selecting unit 94 if the cumulative generated charge amount of the fuel cell stack 1 reaches a predetermined value.

In the above description, the selecting unit 94 determines the operating state of the fuel cell stack 1 based on the impedance detected by the impedance measuring device 8 and the temperature of cooling water detected by the water temperature sensor 54. However, the selecting unit can determine the operating state through estimation without using these. For example, the selecting unit can estimate the internal impedance of the fuel cell stack 1 and the temperature of cooling water based on the initial value of the impedance of the fuel cell stack 1, the initial value of the temperature of cooling water, the sizes of the signals x1 to x4 input into the selecting unit 94, the time-direction differential values of the sizes of the signals x1 to x4, the time-direction integral values of the sizes of the signals x1 to x4, and the like, and output the signals y1 to y4 based on the estimated operating state.

In any cases, when a voltage detected by the voltage sensor 52 is recovered above a rated voltage or when it is considered that the output voltage of the fuel cell stack 1 is recovered above a rated voltage after a predetermined time has elapsed, the selecting unit can select a control mode (y1, y2, y3, y4)=(0, 0, 0, 0) and output the signals of the control mode to the respective recovery control units 92A to 92D.

[Control Flow of Embodiment]

Figure 15:
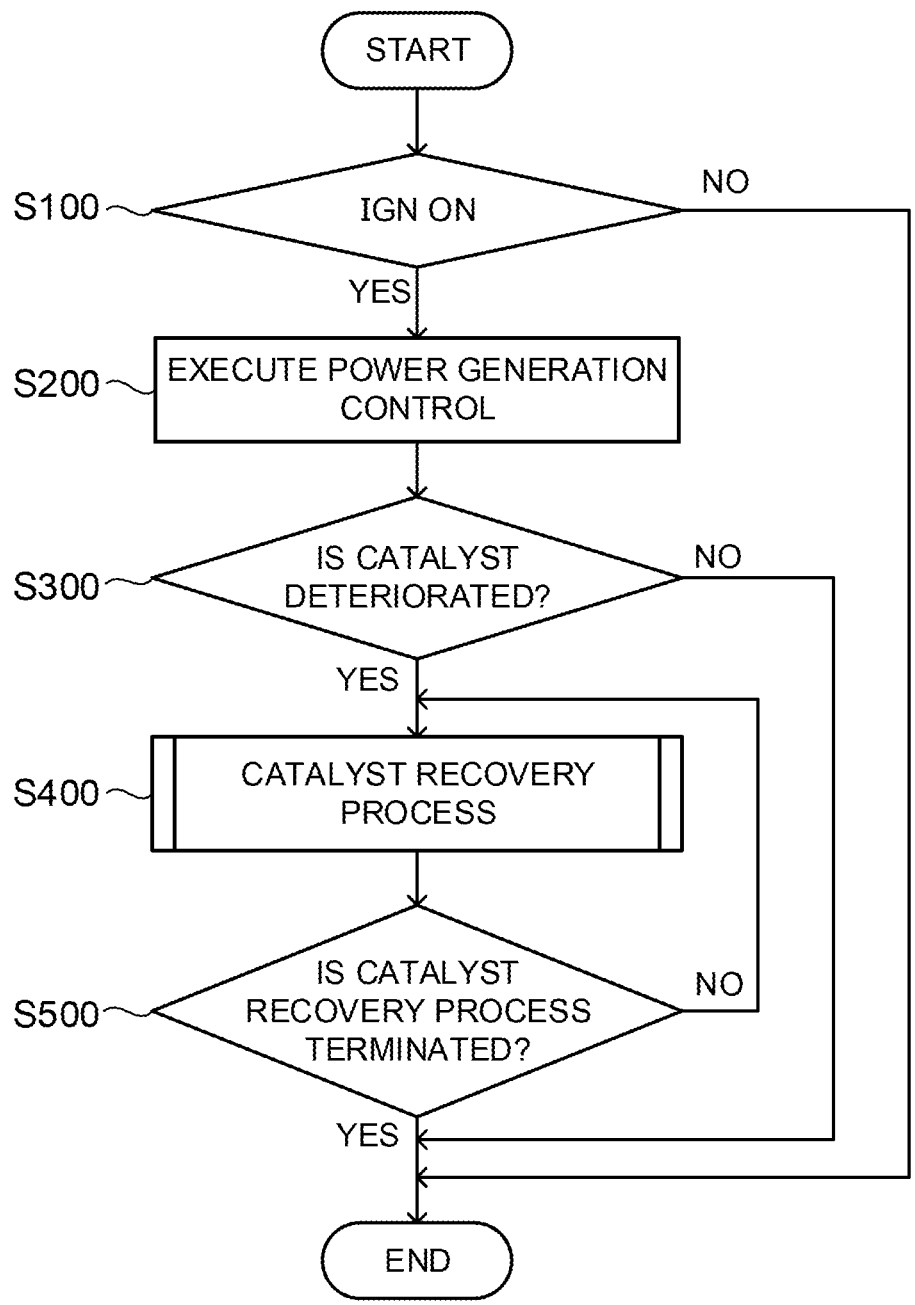
FIG. 15 is a flowchart illustrating the brief of a catalyst recovery process.

FIG. 15 is a flowchart illustrating the brief of the catalyst recovery process.

In Step S100, the controller 9 determines whether an ignition switch (IGN) is ON. The controller executes power generation control (including the case where a power generation amount is zero) in Step S200 when the IGN is ON, and terminates the present routine when the IGN is OFF.

In Step S300, the controller 9 determines whether the anode catalyst is deteriorated due to the CO poisoning. The controller executes the process of Step S400 when it is deteriorated, and terminates the present routine when it is not deteriorated.

Whether or not the anode catalyst is deteriorated may be directly acquired (detected) by using a voltage detected by the voltage sensor 52 as described above or may be indirectly acquired (estimated) by using an elapsed time, a cumulative consumption amount of fuel gas, and an estimated state at the startup.

In Step S400, the controller 9 executes the catalyst recovery process. The catalyst recovery process is a process to increase the above partial pressure difference dP and/or the oxygen permeation coefficient k to cross-leak oxygen from the cathode side to the anode side. On this occasion, the controller estimates or detects the operating state of the fuel cell stack 1 and performs the catalyst recovery process through the auxiliary machines (the compressor 27, the air pressure control valve 62, etc.) based on this operating state.

In Step S500, the controller 9 performs the determination of whether to terminate the catalyst recovery process. The controller terminates the present routine when determining that the catalyst recovery process is terminated, and continues the process of Step S400 when determining that it is not terminated.

Figure 16:
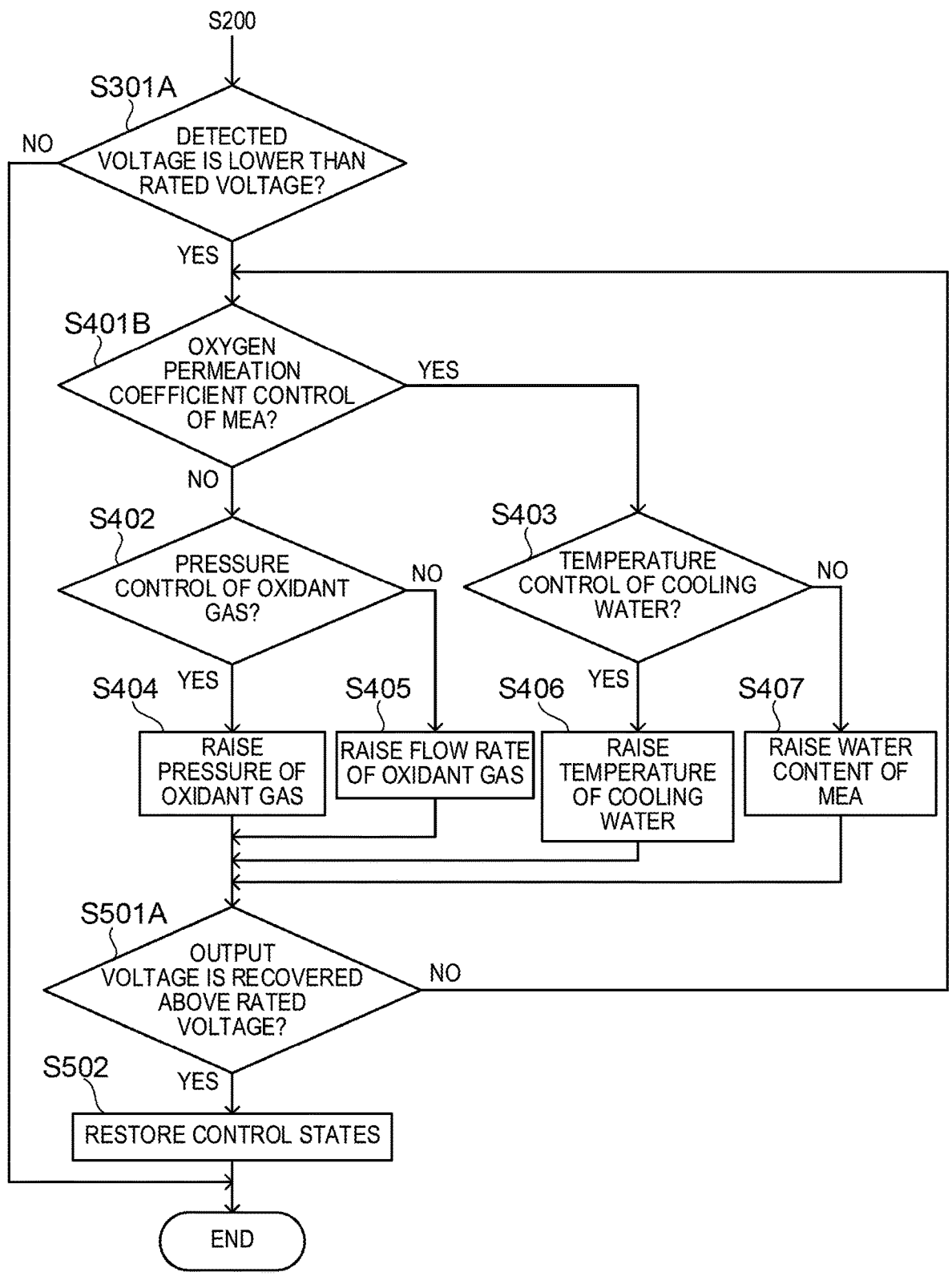
FIG. 16 is a flowchart (1st flowchart) illustrating the details of the catalyst recovery process.

The details of the catalyst recovery process (Step S400 etc.) will be explained. FIG. 16 is a flowchart (1st flowchart) illustrating the details of the catalyst recovery process. The flow illustrated in FIG. 16 is to control any of the pressure of oxidant gas, the flow rate of oxidant gas, the temperature of cooling water, and the wetness degree of the MEA 11 to increase an amount of oxygen permeating the MEA 11 in accordance with the operating state of the fuel cell stack 1.

After Step 200, in Step S301A corresponding to the example of Step S300, the selecting unit 94 determines whether a voltage detected by the voltage sensor 52 has a value lower than a rated voltage, and terminates the present routine if the detected voltage is not less than the rated voltage. In Step S301A, if the voltage detected by the voltage sensor 52 has the value lower than the rated voltage, the selecting unit transfers to Step S401B.

In Step S401B, the selecting unit 94 determines whether to select a control mode of increasing the oxygen permeation coefficient k of the MEA 11 from information on the impedance input from the impedance measuring device 8 and information on the temperature of cooling water input from the water temperature sensor 54 or from information obtained by estimating these. The selecting unit transfers to Step S402 if it is No (negative) and transfers to Step S403 if it is Yes (positive).

In Step S402, when selecting a control mode of increasing the partial pressure difference dP, the selecting unit 94 first determines whether to control the pressure of oxidant gas. Then, when the selecting unit 94 determines that it is Yes (positive), the selecting unit 94 selects a control mode in which the signal y2 becomes 1 (High) and outputs the signal of the control mode to the recovery control unit 92 (the recovery control unit 92B) in Step S404. As a result, the opening degree of the air pressure control valve 62 becomes (x2−z2) to become smaller than the opening degree (x2) set by the power generation control unit 90 and thus the pressure of oxidant gas can be raised. On the other hand, when the selecting unit 94 determines that it is No (negative), the selecting unit 94 selects a control mode in which the signal y1 becomes 1 (High) and outputs the signal of the control mode to the recovery control unit 92 (the recovery control unit 92A) in Step S405. As a result, the output of the compressor 27 becomes (x1+z1) to grow larger than the output (x1) set by the power generation control unit 90 and thus the flow rate of oxidant gas can be increased.

In Step S403, the selecting unit 94 determines whether to control the temperature of cooling water. Then, when the selecting unit 94 determines that it is Yes (positive), the selecting unit 94 selects a control mode in which the signal y4 becomes 1 (High) and outputs the signal of the control mode to the recovery control unit 92 (the recovery control unit 92D) in Step S406. As a result, the opening degree of the bypass valve 65 (or the bypass valve 66) becomes (x4+z4) to grow larger than the opening degree (x4) set by the power generation control unit 90 and thus the temperature of cooling water can be raised. On the other hand, when the selecting unit 94 determines that it is No (negative), the selecting unit 94 selects a control mode in which the signal y3 becomes 1 (High) and outputs the signal of the control mode to the recovery control unit 92 (the recovery control unit 92C) in Step S407. As a result, the opening degree of the purge valve 64 becomes (x3−z3) to become smaller than the opening degree (x3) set by the power generation control unit 90 and thus the humidity degree of fuel gas, namely, the wetness degree of the MEA 11 can be increased.

After performing any of Steps S404 to S407, in Step S501A corresponding to the example of Step S500, the selecting unit 94 determines whether the output voltage of the fuel cell stack 1 detected by the voltage sensor 52 is recovered above the rated voltage. Then, when the selecting unit 94 determines that it is Yes (positive), the selecting unit 94 selects a control mode of "y1 to y4=0" and outputs the signals of the control mode to the recovery control unit 92 in Step S502. As a result, the control states of the fuel cell stack 1 can be restored to original states, namely, control states set by the power generation control unit 90, and then the present routine is terminated. On the other hand, when determining that it is No (negative), the selecting unit 94 returns to Step S401B described above.

Figure 17:
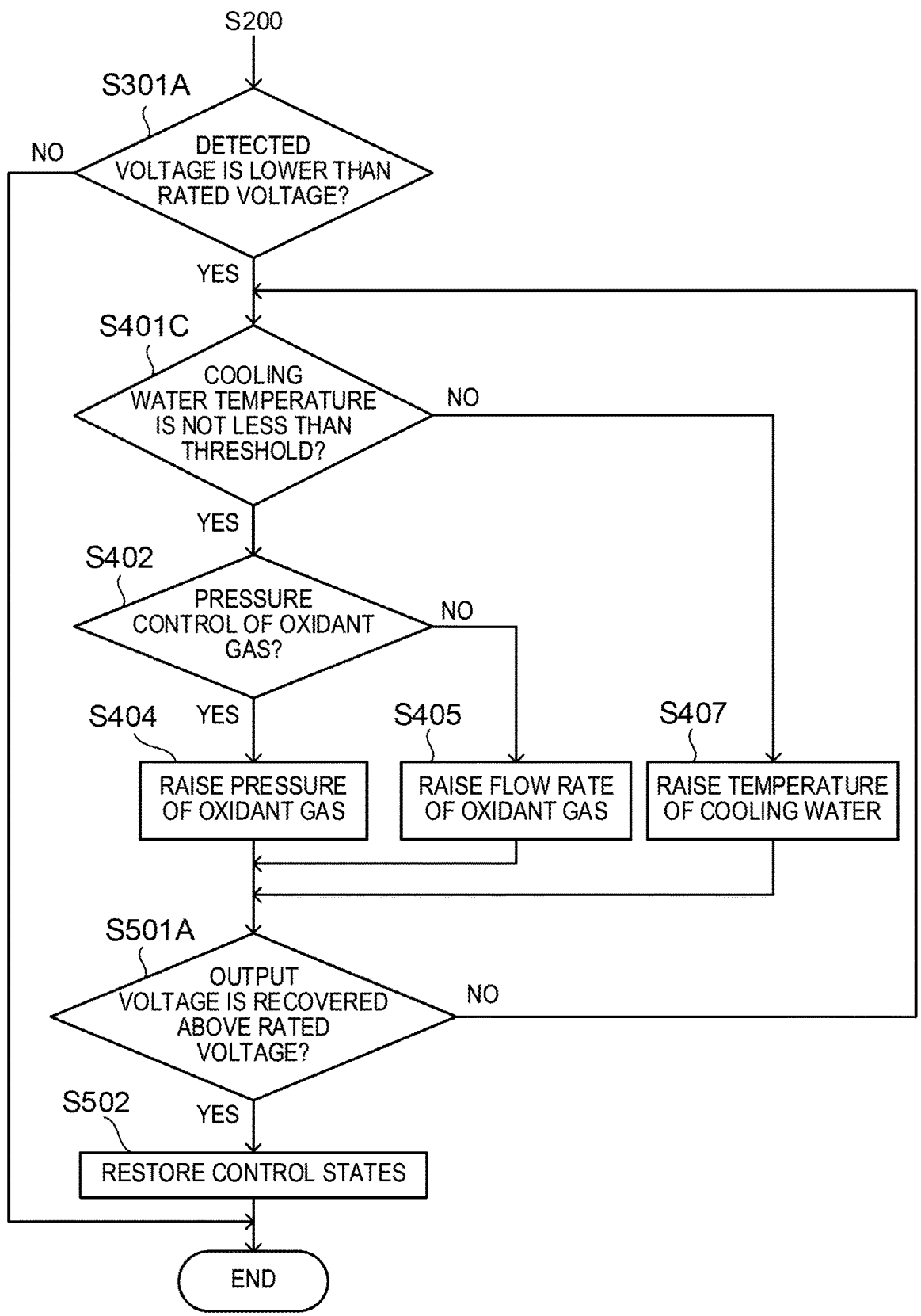
FIG. 17 is a flowchart (2nd flowchart) illustrating the details of the catalyst recovery process.

FIG. 17 is a flowchart (2nd flowchart) illustrating the details of the catalyst recovery process. The flow of FIG. 17 is to preferentially determine whether the temperature of cooling water has a value lower than a certain threshold (corresponding to the minimum temperature above which oxygen can permeate the MEA 11).

After Step S301A described above, the selecting unit 94 determines whether the temperature of cooling water indicated by the water temperature sensor 54 is not less than a predetermined threshold in Step S401C. Then, when the selecting unit 94 determines that it is Yes (positive), namely, that the temperature of cooling water is not less than the predetermined threshold, the selecting unit 94 executes Step S402 and then executes Step 404 or Step S405. On the other hand, when the selecting unit 94 determines that it is No (negative), namely, that the temperature of cooling water is lower than the predetermined threshold, the selecting unit 94 executes Step S407.

The selecting unit 94 performs any of Steps S404, S405, and S407 and then executes Steps S501A and S502 in this order, and then terminates the present routine. When determining that it is No (negative) in Step S501A, the selecting unit 94 returns to Step S401C.

Figure 18:
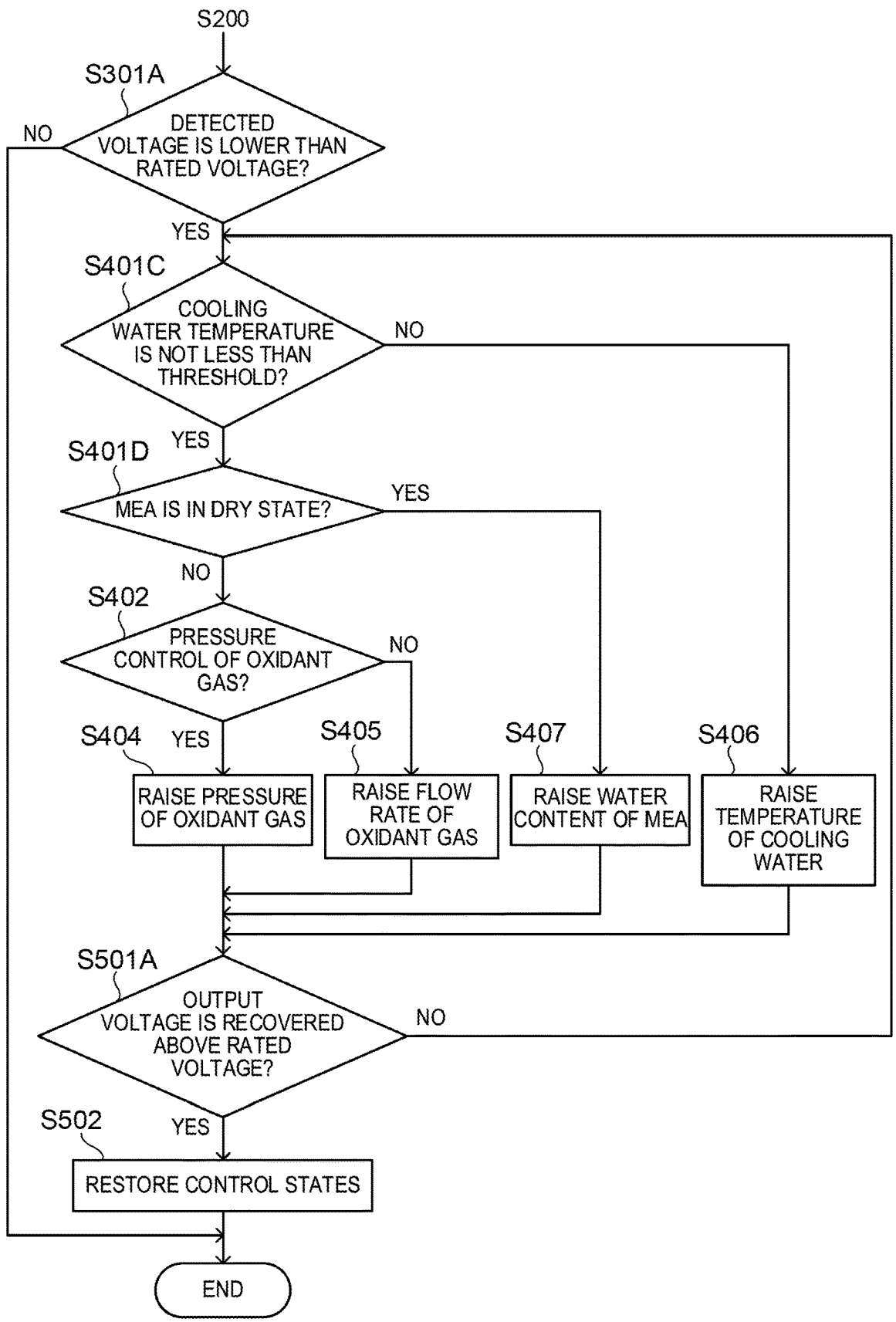
FIG. 18 is a flowchart (3rd flowchart) illustrating the details of the catalyst recovery process.

FIG. 18 is a flowchart (3rd flowchart) illustrating the details of the catalyst recovery process. The flow of FIG. 18 is to preferentially determine whether the temperature of cooling water is not less than the certain threshold (corresponding to the minimum temperature above which oxygen can permeate the MEA 11) and then determine whether the MEA 11 is in a dry state.

When the selecting unit 94 determines that it is No (negative) in Step S401C after executing Steps S301A and S401C in this order, the selecting unit 94 executes Step S406. On the other hand, when the selecting unit 94 determines that it is Yes (positive) in Step S401C, the selecting unit 94 determines whether the MEA 11 is in a dry state (the impedance is in a high state) based on the value of the impedance input from the impedance measuring device 8 in Step S401D.

In Step S401D, when determining that it is Yes (positive), namely, that the MEA 11 is in a dry state (the impedance is in a high state), the selecting unit 94 executes Step S407. On the other hand, in Step S401D, when determining that it is No (negative), namely, that the MEA 11 is in a wet state (the impedance is in a low state), the selecting unit transfers to Step S402 and then executes Step S404 or Step S405. After performing any of Steps S404 to S407, the selecting unit executes Steps S501A and S502 in this order and then terminates the present routine.

Figure 19:
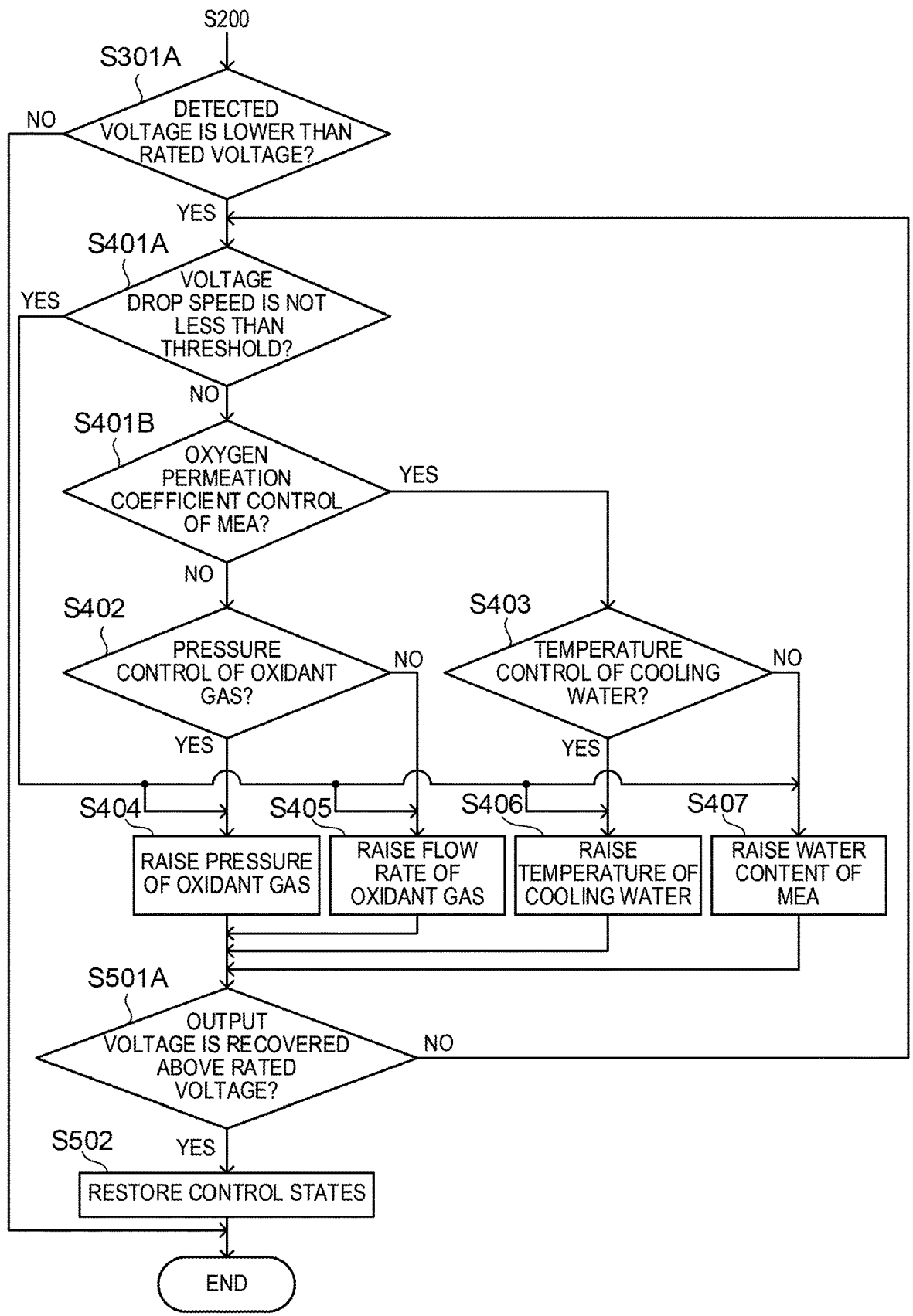
FIG. 19 is a flowchart (4th flowchart) illustrating the details of the catalyst recovery process.

FIG. 19 is a flowchart (4th flowchart) illustrating the details of the catalyst recovery process. The flow of FIG. 19 is to determine that the poisoning of the catalyst layer 112A is rapidly progressing to simultaneously activate all the recovery control for the recovery control units 92A to 92D when the voltage drop speed of the output voltage of the fuel cell stack 1 detected by the voltage sensor 52 is not less than a predetermined threshold.

In Step S401A after Step S301A, the selecting unit 94 determines whether the voltage drop speed of the output voltage of the fuel cell stack 1 is not less than the predetermined threshold based on whether to receive a signal from the voltage drop speed measuring unit 96. When the selecting unit 94 determines that it is No (negative) in Step S401A, the selecting unit 94 executes Step S401B, and executes Step S402 or Step S403 on the basis of Step S401B. The selecting unit executes Step S404 or Step S405 when executing Step S402, and executes Step S406 or Step S407 when executing Step S403.

On the other hand, when determining that it is Yes (positive) in Step S401A, the selecting unit 94 simultaneously executes Step S404, Step S405, Step S406, and Step S407.

After executing any of Step S404 to Step S407 or after executing all of Step S404 to Step S407, the selecting unit 94 executes Steps S501A and S502 and then terminates the present routine. When determining that it is No (negative) in Step S501A, the selecting unit 94 returns to Step S401A.

Herein, the selecting unit 94 determines that the poisoning occurs when the output voltage of the fuel cell stack 1 becomes lower than the rated voltage, but may constantly execute any of the recovery control units 92A to 92D based on the operating state of the fuel cell stack 1. Moreover, when the poisoning of the catalyst layer 112A is already progressing above a predetermined level, namely, when the output voltage of the fuel cell stack 1 becomes lower than a predetermined value lower than the rated voltage, the selecting unit 94 may simultaneously execute Step S404, Step S405, Step S406, and Step S407.

Figure 20:
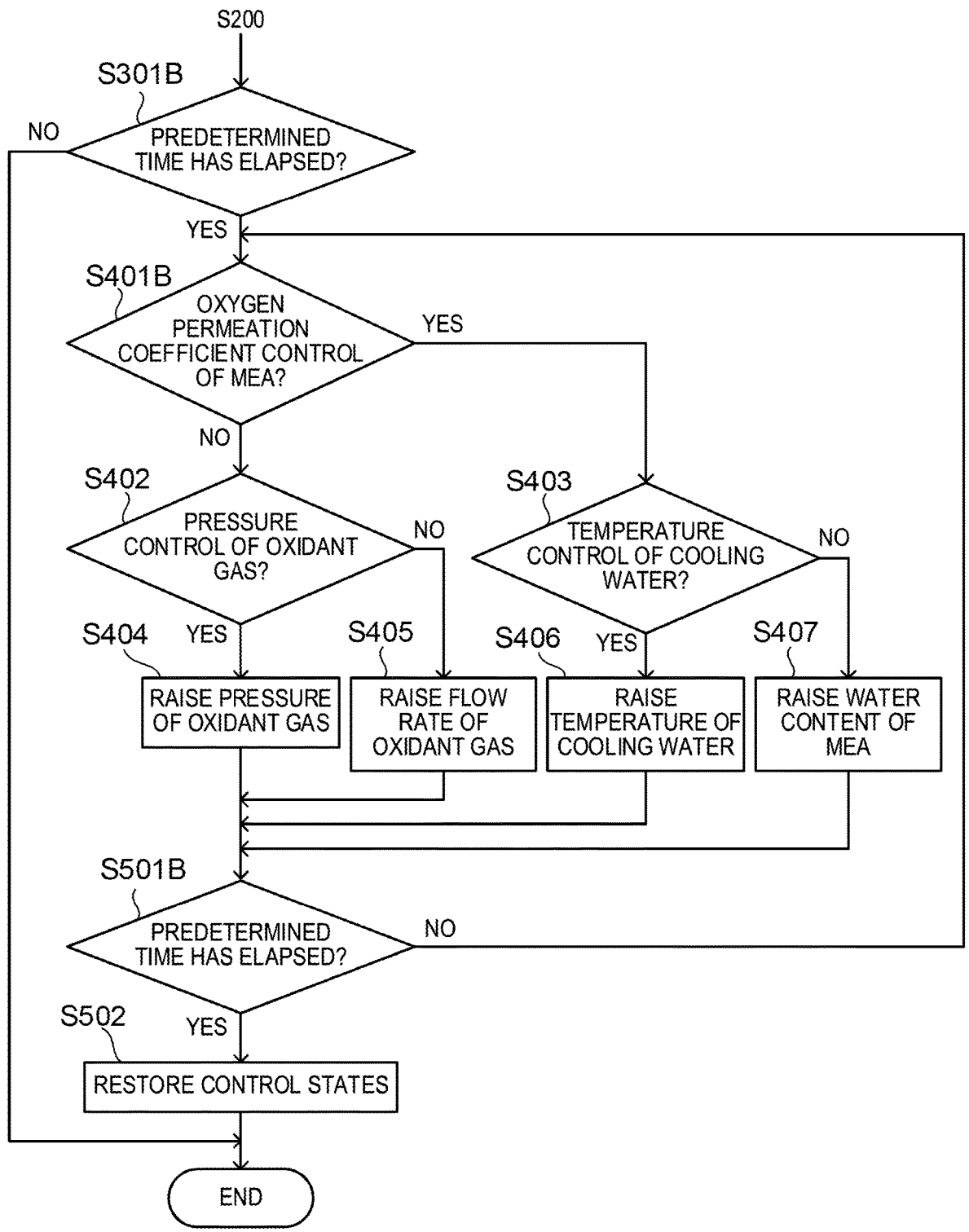
FIG. 20 is a flowchart (5th flowchart) illustrating the details of the catalyst recovery process.

FIG. 20 is a flowchart (5th flowchart) illustrating the details of the catalyst recovery process. The flow of FIG. 20 is to cause the selecting unit 94 to select a control mode by using the timer 55 without using the voltage sensor 52 (deterioration detecting means).

After Step 200, in Step S301B corresponding to the example of Step S300, the selecting unit 94 determines whether a predetermined time has elapsed after the fuel cell stack 1 generates electricity based on timing information input from the timer 55. The selecting unit terminates the present routine if the predetermined time has not yet elapsed. On the other hand, if the predetermined time has already elapsed, the selecting unit transfers to Step S401B and executes the same steps as those of the flow illustrated in FIG. 16 until Step S404, Step S405, Step S406, and Step S407 are executed.

After executing Step S404, Step S405, Step S406, and Step S407, in Step S501B corresponding to the example of Step S500, the selecting unit 94 determines whether a predetermined time required to resolve the poisoning has elapsed. When determining that it is Yes (positive), namely, that the predetermined time has elapsed, the selecting unit 94 considers that the poisoning of the catalyst layer 112A is resolved, and transfers to Step S502 and terminates the present routine. On the other hand, in Step S501B, when determining that it is No (negative), namely, that the predetermined time has not yet elapsed, the selecting unit returns to Step S401B.

The case where any of Step S404 to Step S407 is executed and the case where all of Step S404 to Step S407 are simultaneously executed have been explained in the flows illustrated in FIGS. 16 to 20. However, Step S404 to Step S407 can be performed in an arbitrary combination in accordance with the number (16) of modes of the control mode (y1, y2, y3, y4). Moreover, the recovery control unit 92 only needs to include at least two recovery control units. In the present embodiment, the recovery control unit 92 includes four recovery control units, but may include four or more. If the number of auxiliary machines that change control states is N, the recovery control unit 92 includes N recovery control units, and the number of modes is 2N.

[Effect of Embodiment]

The fuel cell system 100 according to the present embodiment includes: the fuel cell stack 1 that is formed by the MEA 11 including the catalyst layer 112A (anode catalyst) and the catalyst layer 113A (cathode catalyst) between which the electrolyte membrane 111 is sandwiched and the pair of separators (the anode separator 12 and the cathode separator 13) forming the catalyst-layer 112A flow channels and the catalyst-layer 113A flow channels; the fuel gas supply/discharge apparatus 3 that supplies fuel gas to the fuel cell stack 1; the oxidant gas supply/discharge apparatus 2 that supplies oxidant gas to the fuel cell stack 1; the controller 9 that controls these supply/discharge apparatuses in accordance with the operating state of the system; and the catalyst deterioration recovery unit 91 that recovers the deterioration of the catalyst layer 112A. In this system, the catalyst deterioration recovery unit 91 is characterized by including the plurality of catalyst deterioration recovery means (the recovery control units 92A to 92D), the specific operating state detecting means (the selecting unit 94) configured to detect the specific operating state of the system, and the selecting unit 94 that selectively activates the plurality of catalyst deterioration recovery means in accordance with the specific operating state. This results in the fuel cell system 100 that can execute the catalyst recovery process while suppressing the deterioration of the electrolyte membrane 111.

The plurality of catalyst deterioration recovery means is characterized by including the permeation-oxygen-amount increasing means (the recovery control units 92A to 92D) configured to increase an amount of oxygen permeating the MEA 11 from the catalyst-layer 113A flow channels to the catalyst-layer 112A flow channels. As a result, it is possible to reduce a reaction between oxygen and hydrogen outside of the catalyst layer 112A to reduce deterioration due to heat of the catalyst layer 112A.

The permeation-oxygen-amount increasing means is characterized by including: the supply-gas state adjusting means (the recovery control unit 92A and the recovery control unit 92B) configured to control the supply state of fuel gas or the supply state of oxidant gas; and the membrane-electrode-assembly state adjusting means (the recovery control unit 92C and the recovery control unit 92D) configured to control the state of the MEA 11. As a result, the embodiment includes two or more methods of increasing the permeation amount of oxygen in the MEA 11 to be able to raise the reliability of the overall system.

The selecting unit 94 is characterized by detecting the dry/wet state of the electrolyte membrane 111. As a result, it is possible to monitor the oxygen permeation coefficient k of the electrolyte membrane 111.

The selecting unit 94 is characterized by detecting the degree of deterioration of the catalyst layer 112A. As a result, because the catalyst deterioration recovery process is performed after detecting the deterioration of the fuel cell stack 1, it is possible to avoid an unnecessary deterioration recovery process to reduce the energy consumption of the system.

The selecting unit 94 is characterized by estimating the wet state of the fuel cell stack 1 from the cooling water temperature of the fuel cell stack 1. As a result, it is possible to estimate the oxygen permeation coefficient k of the electrolyte membrane 111 in a simple method.

The selecting unit 94 is characterized by selectively driving one of the membrane-electrode-assembly state adjusting means (the recovery control unit 92C and the recovery control unit 92D) and the supply-gas state adjusting means (the recovery control unit 92A and the recovery control unit 92B) in accordance with the dry/wet state of the electrolyte membrane 111. As a result, it is possible to select a method of increasing the permeation amount of oxygen in the MEA 11 in accordance with the dry/wet state of the fuel cell stack 1.

The selecting unit 94 is characterized by driving the membrane-electrode-assembly state adjusting means (the recovery control unit 92C and the recovery control unit 92D) when detecting that the electrolyte membrane 111 is in a dry state. As a result, the catalyst layer 112A can be recovered from the poisoning by surely raising the oxygen permeation coefficient k of the electrolyte membrane 111.

The selecting unit 94 is characterized by driving the supply-gas state adjusting means (the recovery control unit 92A and the recovery control unit 92B) when detecting that the electrolyte membrane 111 is in a wet state. As a result, the catalyst layer 112A can be recovered from the poisoning by increasing the supplied amount of oxidant to the electrolyte membrane 111.

The selecting unit 94 is characterized by driving both of the membrane-electrode-assembly state adjusting means (the recovery control unit 92C and the recovery control unit 92D) and the supply-gas state adjusting means (the recovery control unit 92A and the recovery control unit 92B) when the catalyst deterioration detecting means (the voltage sensor 52) detects that the degree of deterioration is not less than a predetermined value. As a result, when the deterioration of the catalyst layer 112A is progressing above a predetermined level, the catalyst layer 112A can be efficiently recovered from the poisoning by executing the plurality of catalyst recovery processes.

The control method of the fuel cell system 100 according to the present embodiment is to: control the amounts of fuel gas and oxidant gas to be supplied to the fuel cell stack 1 (the fuel cell 10), which is formed by the MEA 11 including the catalyst layer 112A (anode catalyst) and the catalyst layer 113A (cathode catalyst) and the pair of separators (the anode separator 12 and the cathode separator 13) forming the catalyst-layer 112A flow channels and the catalyst-layer 113A flow channels, in accordance with the operating state (the request of the load 7) of the system; and also to perform the recovery control for recovering the deterioration of the catalyst layer 112A. This control method is characterized by including: Step (S401B) of detecting (or estimating) the specific operating state of the system; and Steps (Step S404, Step S405, Step S406, and Step S407) of selectively activating the recovery control based on the specific operating state when oxygen is caused to permeate the MEA 11 to be forcibly supplied to the catalyst layer 112A by using the plurality of recovery controls (the recovery control units 92A to 92D) of changing the state of the MEA 11 and/or at least one flow-channel state of the catalyst-layer 112A flow channels and the catalyst-layer 113A flow channels.

The fuel cell system 100 of the present embodiment that embodies the above includes: the fuel cell stack 1 that is formed by the MEA 11 including the catalyst layer 112A (anode catalyst) and the catalyst layer 113A (cathode catalyst) and the pair of separators (the anode separator 12 and the cathode separator 13) forming the catalyst-layer 112A flow channels and the catalyst-layer 113A flow channels; the fuel gas supply/discharge apparatus 3 that supplies fuel gas to the fuel cell stack 1; the oxidant gas supply/discharge apparatus 2 that supplies oxidant gas to the fuel cell stack 1; the power generation control unit 90 that controls these supply systems in accordance with the operating state of the system; and the catalyst deterioration recovery unit 91 that recovers the deterioration of the catalyst layer 112A. In this system, the catalyst deterioration recovery unit 91 includes the recovery control unit 92 (oxidant supply means) that forcibly supplies oxygen (oxidant) to the catalyst layer 112A and the selecting unit 94 (oxidant supply control means) that controls the recovery control unit 92. The recovery control unit 92 includes: the recovery control unit 92C and the recovery control unit 92D (membrane-electrode-assembly state adjusting means) that control the state of the MEA 11; and the recovery control unit 92A and the recovery control unit 92B (supply-gas state adjusting means) that control the supply state of fuel gas or the supply state of oxidant gas. The oxidant supply control means is characterized by including the specific operating state detecting means (the selecting unit 94) configured to detect the operating state (specific operating state) of the system and the selecting unit 94 that selectively activates the recovery control unit 92 in accordance with the operating state.

By employing the above configuration, oxygen permeated from the cathode side of the MEA 11 arrives at the catalyst layer 112A subjected to poisoning by carbon monoxide (CO) (catalytic reaction is deteriorated). Then, CO is changed and eliminated to carbon dioxide by a chemical reaction with the oxygen, and thus the catalytic reaction of the MEA 11 (the catalyst layer 112A) can be recovered. Therefore, because oxygen is not directly supplied to the catalyst layer 112A through the fuel gas supply passage 31 etc., the chemical corrosion of the MEA 11 can be reduced without forming a local battery on the anode side of the MEA 11. Moreover, because a reaction between oxygen permeating the MEA 11 and CO adsorbed to the catalyst layer 112A becomes dominant and thus the combustion of hydrogen is suppressed, the physical deterioration of the MEA 11 can be also reduced.

The permeation amount of oxygen in the MEA 11 can be increased by changing the control states of the auxiliary machines (the compressor 27, the air pressure control valve 62, etc.) that constitute the fuel cell system 100. However, the recovery controls and its combination through the most suitable auxiliary machines for efficiently increasing the permeation amount of oxygen are different depending on the operating state of the fuel cell stack 1. Therefore, the most suitable recovery control for increasing the permeation amount of oxygen is selected after determining the operating state of the fuel cell stack 1. As a result, it is possible to efficiently increase an electrochemically valid catalyst surface area in the MEA 11 to perform the recovery of a catalytic reaction in the MEA 11 or the prevention of deterioration of the catalytic reaction.

The recovery control unit 92 is characterized by increasing the supplied amount of oxygen (oxidant) permeating the MEA 11. As a result, it is possible to reduce a reaction of oxygen and hydrogen outside of the MEA 11 to reduce deterioration due to heat of the MEA 11.

The recovery control units 92A and 92B perform control of increasing the partial pressure difference dP of oxygen (oxidant) between the cathode side and the anode side of the MEA 11 to increase the supplied amount of oxygen that permeates the MEA 11 and is supplied to the catalyst layer 112A. Moreover, the recovery control units 92C and 92D are characterized by performing control of increasing the oxygen permeation coefficient k of the MEA 11 to increase the supplied amount of oxygen that permeates the MEA 11 and is supplied to the catalyst layer 112A. As a result, it is possible to select a method of increasing the permeation amount of oxygen in the MEA 11 in accordance with the operating state of the fuel cell stack 1.

The supply-gas state adjusting means (the recovery control unit 92A and the recovery control unit 92D) is characterized by controlling at least one of the pressure and flow rate of oxidant gas. As a result, the supplied amount of oxygen (oxidant) permeating the MEA 11 can be controlled in a simple method.

The oxidant gas supply/discharge apparatus 2 includes the compressor 27 that adjusts the flow rate of oxidant gas and the air pressure control valve 62 that adjusts the pressure of oxidant gas. The supply-gas state adjusting means is characterized by a means configured to change the flow rate and/or pressure of oxidant gas to increase the partial pressure difference dP of oxidant between the cathode side and the anode side and by including the recovery control unit 92A that controls the compressor 27 to increase the flow rate of oxidant gas and the recovery control unit 92B that controls the air pressure control valve 62 to increase the pressure of oxidant gas. As a result, in the existing apparatus, it is possible to perform control of increasing the partial pressure difference dP of oxygen between the cathode side and the anode side of the MEA 11 in order to increase the permeation amount of oxygen in the MEA 11.

The fuel cell system includes the cooling water circulation apparatus 4 that circulates cooling water in the fuel cell stack 1. The cooling water circulation apparatus 4 includes the bypass valve 65 (or the bypass valve 66) that adjusts the temperature of cooling water. The fuel gas supply/discharge apparatus 3 includes the purge valve 64 that adjusts the humidity degree of fuel gas. Herein, the membrane-electrode-assembly state adjusting means is characterized by including the recovery control unit 92C that controls the purge valve 64 to raise the humidity degree of fuel gas so as to raise the oxygen permeation coefficient k of the MEA 11 and the recovery control unit 92D that controls the bypass valve 65 (or the bypass valve 66) to raise the temperature of cooling water so as to raise the oxygen permeation coefficient k. As a result, in the existing apparatus, it is possible to perform control of increasing the oxygen permeation coefficient k of the MEA 11 in order to increase the permeation amount of oxygen in the MEA 11.

The selecting unit 94 is characterized by selecting and activating at least one of the recovery control units 92A to 0-92D based on the detected operating state. As a result, in the existing apparatus, it is possible to increase the permeation amount of oxygen in the MEA 11 by detecting the operating state of the fuel cell stack 1. Particularly, the most suitable control can be selected from among control of increasing the partial pressure difference dP of oxygen between the cathode side and the anode side of the MEA 11 and control of increasing the oxygen permeation coefficient k of the MEA 11.

The fuel cell system includes the cooling water circulation apparatus 4 that circulates cooling water in the fuel cell stack 1. The cooling water circulation apparatus 4 includes the bypass valve 65 (or the bypass valve 66) that adjusts the temperature of cooling water. The membrane-electrode-assembly state adjusting means includes the recovery control unit 92D that controls the bypass valve 65 (or the bypass valve 66) to raise the oxygen permeation coefficient k of the MEA 11. The specific operating state detecting means includes the water temperature sensor 54 that detects the temperature of cooling water. Herein, the selecting unit 94 is characterized by selecting and activating the recovery control unit 92D when detecting a state in which the temperature of cooling water is lower than the predetermined threshold as the operating state. As a result, while suppressing the power consumption of the auxiliary machines of the fuel cell system 100, it is possible to raise the temperature of the MEA 11 to increase the oxygen permeation coefficient k of the MEA 11 to remove a poisoning substance (CO) and thus recover a catalytic reaction in the MEA 11.

The fuel gas supply/discharge apparatus 3 includes the purge valve 64 that adjusts the humidity degree of fuel gas. The membrane-electrode-assembly state adjusting means includes the recovery control unit 92C that controls the purge valve 64 to raise the oxygen permeation coefficient k of the MEA 11. The specific operating state detecting means includes the water temperature sensor 54 that detects the temperature of cooling water circulating through the fuel cell stack 1 and the impedance measuring device 8 that detects the wetness degree of the MEA 11. Herein, the selecting unit 94 is characterized by selecting and activating the recovery control unit 92C as the operating state when detecting a state in which the temperature of cooling water is not less than the predetermined threshold and a state in which the MEA 11 is dry. As a result, while suppressing the power consumption of the auxiliary machines of the fuel cell system 100, it is possible to raise the wetness degree of the MEA 11 to increase the oxygen permeation coefficient k of the MEA 11 to remove a poisoning substance and thus recover a catalytic reaction in the MEA 11.

The specific operating state detecting means (the selecting unit 94) includes the water temperature sensor 54 that detects the temperature of cooling water circulating through the fuel cell stack 1 and the wetness degree detecting means (the impedance measuring device 8) configured to detect the wetness degree of the MEA 11. The selecting unit 94 is characterized by selecting and activating the flow-channel state control means (the recovery control units 92A and 92B) as the operating state when detecting a state in which the temperature of cooling water is not less than the predetermined threshold and a state in which the MEA 11 is wet. As a result, while suppressing the power consumption of the auxiliary machines of the fuel cell system 100, it is possible to increase the partial pressure difference dP of oxygen in the MEA 11 to remove a poisoning substance and thus rapidly recover a catalytic reaction in the MEA 11.

It is characterized that the impedance measuring device 8 measures the impedance of the MEA 11 and the selecting unit 94 detects the wetness degree of the MEA 11 based on the impedance. As a result, it is possible to determine the increase or decrease of the wetness degree of the MEA 11 in a simple method.

The specific operating state detecting means (the selecting unit 94) includes the deterioration detecting unit (the voltage sensor 52) that detects the deteriorated state of the MEA 11. The selecting unit 94 performs the selection operation of the recovery control unit 92 when detecting the deterioration of the MEA 11. As a result, because the recovery control unit 92 is activated after detecting the deterioration of the fuel cell stack 1, it is possible to avoid an unnecessary deterioration recovery process to reduce energy consumption.

It is characterized that the deterioration detecting unit is the voltage sensor 52 that detects the output voltage of the fuel cell stack 1 and the selecting unit 94 determines that the MEA 11 is deteriorated when the output voltage becomes lower than the predetermined threshold. As a result, the deterioration of the catalyst layer 112A of the fuel cell stack 1 can be detected with a simple configuration.

The selecting unit 94 is characterized by executing all control in the recovery control unit 92 when the voltage drop of the output voltage is not less than the predetermined speed. As a result, the intensity of the oxidation removal of a poisoning substance on the MEA 11 can be selected in accordance with the deterioration speed due to poisoning. Moreover, when the deterioration by poisoning is small, energy consumption can be minimized by activating only some of the auxiliary machines for the recovery control.

As described above, the embodiment of the present invention has been explained, but the above embodiment is only a part of the application example of the present invention and the technical scope of the present invention is not intended to be limited to the specific configuration of the above embodiment.

The invention claimed is:
1. A fuel cell system comprising:
a fuel cell body that is formed by a membrane electrode assembly including an anode catalyst and a cathode catalyst between which an electrolyte membrane is sandwiched and a pair of separators forming an anode-catalyst-side flow channel and a cathode-catalyst-side flow channel;
a fuel supply system configured to supply fuel gas to the fuel cell body;
an oxidant supply system configured to supply oxidant gas to the fuel cell body;
and
a controller programmed to
control the fuel supply system and the oxidant supply system in accordance with an operating state of the fuel cell system, detect a specific operating state of the fuel cell system, and selectively activate at least one of a plurality of catalyst deterioration recovery controls to recover from deterioration of the anode catalyst, in accordance with the specific operating state, wherein the plurality of catalyst deterioration recovery controls includes a permeation-oxygen-amount increasing control configured to increase an amount of oxygen that permeates the membrane electrode assembly from the cathode-catalyst-side flow channel to the anode-catalyst-side flow channel;

wherein the permeation-oxygen-amount increasing control includes:

a supply-gas state adjusting control configured to control a supply state of the fuel gas or a supply state of the oxidant gas;

and a membrane-electrode-assembly state adjusting control configured to control a state of the membrane electrode assembly.

2. The fuel cell system according to claim 1, wherein the controller is programmed to detect as the specific operating state a dry/wet state of the electrolyte membrane.

3. The fuel cell system according to claim 1, wherein the controller is programmed to detect as the specific operating state a deterioration degree of the anode catalyst and cathode catalyst.

4. The fuel cell system according to claim 2, wherein the controller is programmed to detect as the specific operating state a wet state of the fuel cell body from a cooling water temperature of the fuel cell body.

5. The fuel cell system according to claim 3, wherein the controller is programmed to selectively drive one of the membrane-electrode-assembly state adjusting control or the supply-gas state adjusting control in accordance with a dry/wet state of the electrolyte membrane.

6. The fuel cell system according to claim 3, wherein the controller is programmed to drive the membrane-electrode-assembly state adjusting control when detecting that the electrolyte membrane is in a dry state.

7. The fuel cell system according to claim 3, wherein the controller is programmed to drive the supply-gas state adjusting control when detecting that the electrolyte membrane is in a wet state.

8. The fuel cell system according to claim 3, wherein the controller is programmed to drive both of the membrane-electrode-assembly state adjusting control and the supply-gas state adjusting control when a catalyst deterioration detecting control detects that a deterioration degree is not less than a predetermined value.

9. The fuel cell system according to claim 1, wherein the controller is programmed to recover from a carbon monoxide (CO) poisoning of the anode catalyst by selectively activating at least one of the plurality of catalyst deterioration recovery controls in accordance with the specific operating state.

* * * * *